(12) United States Patent (10) Patent No.: US 8,130,275 B2
Matsushima et al. (45) Date of Patent: Mar. 6, 2012

(54) INFORMATION-PROCESSING APPARATUS, AND STORAGE MEDIUM STORING A PHOTOGRAPHING APPLICATION LAUNCH PROGRAM EXECUTED BY INFORMATION-PROCESSING APPARATUS

(75) Inventors: Yoshihiro Matsushima, Kyoto (JP); Yuki Onozawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 703 days.

(21) Appl. No.: 12/219,317

(22) Filed: Jul. 18, 2008

(65) Prior Publication Data

US 2009/0310957 A1 Dec. 17, 2009

(30) Foreign Application Priority Data

Jun. 13, 2008 (JP) ................................. 2008-155446
Jun. 30, 2008 (JP) ................................. 2008-171276

(51) Int. Cl.
*H04N 5/225* (2006.01)
(52) U.S. Cl. ................ 348/207.1; 348/222.1; 348/231.6
(58) Field of Classification Search .............. 348/207.1, 348/222.1, 231.99, 231.6
See application file for complete search history.

(56) References Cited

U.S. PATENT DOCUMENTS 4,853,733 A 8/1989 Watanabe et al.
(Continued)

FOREIGN PATENT DOCUMENTS

EP 1 785 854 5/2007
(Continued)

OTHER PUBLICATIONS

W61CA by CASIO, User Manual, Japan, KDDI Corporation, Jan. 2008, pp. 27, 34-37, and 120-121.

(Continued)

*Primary Examiner* — Gevell Selby
(74) *Attorney, Agent, or Firm* — Nixon & Vanderhye P.C.

(57) ABSTRACT

An information-processing apparatus stores in advance a photographing application program. Further, the information-processing apparatus comprises photographing processing means which has a function different from that of the photographing application program. In a launch acceptance state, the information-processing apparatus accepts a first launch operation for selectively launching a plurality of application programs, and a photographing enabling operation for setting a state of the information-processing apparatus to a photographing enabled state. The photographing enabling operation is different from the first launch operation, and is the same as a photographing operation.

19 Claims, 17 Drawing Sheets

U.S. PATENT DOCUMENTS

| | | | |
|---|---|---|---|
| 5,477,264 A * | 12/1995 | Sarbadhikari et al. | 348/231.6 |
| 5,982,429 A | 11/1999 | Kamamoto et al. | |
| 6,222,538 B1 | 4/2001 | Anderson | |
| 6,515,704 B1 | 2/2003 | Sato | |
| 6,680,749 B1 | 1/2004 | Anderson et al. | |
| 2001/0038748 A1 | 11/2001 | Onuki | |
| 2004/0080518 A1 | 4/2004 | Lee | |
| 2005/0278636 A1 | 12/2005 | Nomoto | |
| 2006/0017833 A1 * | 1/2006 | Gong et al. | 348/335 |
| 2006/0051083 A1 | 3/2006 | Yamamoto | |
| 2006/0103633 A1 | 5/2006 | Gioeli | |
| 2006/0146174 A1 | 7/2006 | Hagino | |
| 2007/0195173 A1 * | 8/2007 | Nozaki et al. | 348/216.1 |
| 2008/0050111 A1 * | 2/2008 | Lee et al. | 396/429 |
| 2008/0165259 A1 * | 7/2008 | Nobels | 348/231.2 |

FOREIGN PATENT DOCUMENTS

| | | |
|---|---|---|
| JP | 2000-222185 | 8/2000 |
| JP | 2004-015779 | 1/2004 |
| JP | 2004-260760 | 9/2004 |
| JP | 2005-065235 | 3/2005 |
| JP | 2005-079910 | 3/2005 |
| JP | 2005-94782 | 4/2005 |
| JP | 2005-323241 | 11/2005 |
| JP | 2006-039203 | 2/2006 |
| JP | 2006-72466 | 3/2006 |
| JP | 2006-80779 | 3/2006 |
| JP | 2006-139676 | 6/2006 |
| JP | 2006-201466 | 8/2006 |
| JP | 2006-319561 | 11/2006 |
| JP | 2007-150898 | 6/2007 |
| JP | 2007-249222 | 9/2007 |

OTHER PUBLICATIONS

Yasuhara, "Chotto Shoto Edit Software Manual" Sony Computer Entertainment, Nov. 2, 2006, 5 pages, with partial translation.

Office Action mailed Apr. 19, 2011 in co-pending U.S. Appl. No. 12/213,695.

Office Action Mailed Jul. 14, 2011 in U.S. Appl. No. 12/243,355 (16 pages).

Office Action Mailed Oct. 11, 2011 in U.S. Appl. No. 12/213,695 (22 pages).

* cited by examiner

INFORMATION-PROCESSING APPARATUS, AND STORAGE MEDIUM STORING A PHOTOGRAPHING APPLICATION LAUNCH PROGRAM EXECUTED BY INFORMATION-PROCESSING APPARATUS

CROSS REFERENCE TO RELATED APPLICATION

The disclosure of Japanese Patent Application No. 2008-171276, filed on Jun. 30, 2008, is incorporated herein by reference.

BACKGROUND AND SUMMARY

1. Field of the Technology

The present technology relates to an information-processing apparatus and a launch program executed by the information-processing apparatus, and more particularly, to an information-processing apparatus which is capable of selectively executing a plurality of application programs and a launch program executed by the information-processing apparatus.

2. Description of the Background Art

Conventionally, there is an information-processing apparatus which is capable of executing various application programs such as a game application, and the like and which is capable of functioning as an imaging apparatus by mounting a camera thereto (refer to Non-Patent Document 1 ("Chotto Shot Camera Instruction Manual" published by Sony Computer Entertainment Inc. on Nov. 2, 2006)). An information-processing apparatus described in the Non-Patent Document 1 is capable of executing an application program stored in a detachable storage medium. By mounting thereto a storage medium storing an application program (referred to as a first application program) described in the Non-Patent Document 1, it is possible to perform photographing using a camera mounted to the information-processing apparatus, and to view and edit a photographed image. In addition, it is possible for the information-processing apparatus to perform photographing by executing a second application program for executing photographing program which is stored in a detachable storage medium (memory card) which is different from the storage medium (optical disc) storing the first program. Thus, in the information-processing apparatus, it is possible to perform photographing by the two different application programs for photographing.

The present technology is for solving at least either the following problem 1 or 2.

(1) Problem 1

In the information-processing apparatus described in the Non-Patent Document 1, the first and second application programs each are launched by performing an operation in a menu screen a plurality of times. Then, a photographing operation for performing photographing is performed by an operation which is different from an operation for launch. Thus, for performing photographing from an initial state of the menu screen, after performing an operation for launching the first or second application program by selecting an icon image displayed on the menu screen a plurality of times, a user has to perform another photographing operation. Therefore, the user cannot perform photographing directly from the initial state of the menu screen, and cannot easily use a photographing function which the information-processing apparatus has (cannot easily launch an application program for photographing to perform photographing).

(2) Problem 2

In the information-processing apparatus described in the Non-Patent Document 1, the first and second application programs each are not terminated unless the user performs a predetermined termination operation. Thus, there is a fear that a user who does not fully understand a manner of operation, such as a user who uses the information-processing apparatus for the first time, and the like, will not know how to terminate an application and will not be able to terminate a photographing function. Especially, in the case of setting in which another application program cannot be launched during execution of the first or second application program, even though the information-processing apparatus has various functions in addition to the photographing function, since the photographing function cannot be terminated, an opportunity of launching another application program is deprived.

SUMMARY

Therefore, a feature of an example embodiment presented herein is to provide a user-friendly information-processing apparatus which is capable of using a photographing function by a simple operation.

The present embodiment has the following features to attain the object mentioned above. It is noted that reference characters and supplementary explanations in parentheses in this section are merely provided to facilitate the understanding of the present embodiment in relation to the later-described embodiment, rather than limiting the scope of the present embodiment in any way.

A first aspect is a launch program (61) executed by a computer (a CPU 31) of an information-processing apparatus (10), which comprises imaging means (cameras 23 and 24), which is capable of storing a plurality of application programs (53-56), and which stores in advance a predetermined photographing application program (53) for performing photographing by the imaging means as one of the plurality of application programs. The launch program is a program for selectively launching an application program desired by a user among the plurality of application programs. The launch program causes the computer to function as: first launch operation acceptance means (the CPU 31 executing steps S6 and S11; hereinafter, steps are indicated by step numbers); first launch means (S12); photographing processing means (S10); photographing enabling operation acceptance means (S6, S9); and state setting means (S10 is executed in the case of Yes at S9). The first launch operation acceptance means is means for accepting a first launch operation for selectively launching the plurality of application programs. The first launch means is means for, when the first launch operation is performed, launching an application program selected by the first launch operation among the plurality of application programs. The photographing processing means is means for, in a predetermined photographing enabled state, executing photographing processing of storing a taken image by the imaging means in storage means of the information-processing apparatus in accordance with a predetermined photographing operation photographing enabling operation acceptance means is means for, in a launch acceptance state of accepting the first launch operation, accepting an photographing enabling operation which is the same as the photographing operation. The state setting means is means for, when the photographing enabling operation is detected, setting a state of the information-processing apparatus to the photographing enabled state.

According to the above aspect, since the photographing enabling operation and the photographing operation are the same as each other, a series of operations for shifting the state of the information-processing apparatus to the photographing enabled state and further performing photographing can be performed by one type of an operation, and thus the series of operations can be easily performed. Thus, the photographing function can be used by a simple operation, and a user-friendly information-processing apparatus can be provided.

Further, the launch program may further cause the computer to function as cancellation means (S25) for, in the photographing enabled state, automatically canceling the photographing enabled state in accordance with satisfaction of a predetermined condition.

According to the above, the photographing enabled state is automatically canceled without performing a dedicated operation for canceling the photographing enabled state. Thus, it is prevented that a user who does not fully understand a manner of operation does not know how to terminate the photographing function by the photographing processing means and cannot terminate the photographing function, and a user-friendly information-processing apparatus can be provided.

A second aspect is a launch program (61) executed by a computer (a CPU 31) of an information-processing apparatus (10), which comprises imaging means (cameras 23 and 24), which is capable of storing a plurality of application programs (53-56), and which stores in advance a predetermined photographing application program (53) for performing photographing by the imaging means as one of the plurality of application programs. The launch program is a program for selectively launching an application program desired by a user among the plurality of application programs. The launch program causes the computer to function as: first launch operation acceptance means (steps S6 and S11); first launch means (S12); photographing processing means (S10); photographing enabling operation acceptance means (S6, S9); state setting means (S10 is executed in the case of Yes at S9); and cancellation means (simplified photographing processing is terminated in the case of Yes at S25). The first launch operation acceptance means is means for accepting a first launch operation for selectively launching the plurality of application programs. The first launch means is means for, when the first launch operation is performed, launching an application program selected by the first launch operation among the plurality of application programs. The photographing processing means is means for, in a predetermined photographing enabled state, executing photographing processing of storing a taken image by the imaging means in storage means of the information-processing apparatus in accordance with a predetermined photographing operation. The photographing enabling operation acceptance means is means for, in a launch acceptance state of accepting the first launch operation, accepting a predetermined photographing enabling operation. The state setting means is means for, when the photographing enabling operation is performed, setting a state of the information-processing apparatus to the photographing enabled state.

According to the above, the photographing enabled state is automatically canceled without performing a dedicated operation for canceling the photographing enabled state. Thus, it is prevented that a user who does not fully understand a manner of operation cannot terminate the photographing function by the photographing processing means due to a fact that the user does not know how to terminate the photographing function, and a user-friendly information-processing apparatus can be provided. The above aspect is effective especially in the case where another application program cannot be executed during execution of a first or second application program as in a later-described embodiment.

Further, in the above first or second aspect, the cancellation means may automatically cancel the photographing enabled state in accordance with execution of the photographing processing a predetermined number of times (e.g. one time) in the photographing enabled state.

According to the above, when the photographing operation is performed a predetermined number of times (e.g. one time) in the photographing enabled state, the photographing enabled state is terminated (after the photographing processing is performed). In other words, when the user performs the photographing operation a predetermined number of times in the photographing enabled state, the state of the information-processing apparatus returns to the launch acceptance state. Thus, even a novice user who has not read an instruction manual, and the like can naturally return to the launch acceptance state by performing the photographing operation. Therefore, a state that "the user does not know how to return from the photographing enabled state to the launch acceptance state" can be prevented, and a user-friendly information-processing apparatus can be provided.

Further, the photographing operation and the photographing enabling operation each may be a single operation with respect to a predetermined button, which is different from the first launch operation.

According to the above, setting of the photographing enabled state and photographing each are performed by a single operation with respect to a predetermined button, and thus can be performed by an exceedingly simple operation.

A third aspect is a launch program (61) executed by a computer (a CPU 31) of an information-processing apparatus (10), which comprises imaging means (cameras 23 and 24), which is capable of storing a plurality of application programs (53-56), and which stores in advance a predetermined photographing application program (53) for performing photographing by the imaging means as one of the plurality of application programs. The launch program is a program for selectively launching an application program desired by a user among the plurality of application programs. The launch program causes the computer to function as: first launch operation acceptance means (steps S6 and S11); first launch means (S12); photographing processing means (S10); photographing enabling operation acceptance means (S6, S9); and photographing operation acceptance means (S24, S25). The first launch operation acceptance means is means for accepting a first launch operation for selectively launching the plurality of application programs. The first launch means is means for, when the first launch operation is performed, launching an application program selected by the first launch operation among the plurality of application programs. The photographing processing means is means for executing photographing processing of storing a taken image by the imaging means in storage means of the information-processing apparatus in accordance with a predetermined photographing operation. The photographing enabling operation acceptance means is means for, in a launch acceptance state of accepting the first launch operation, accepting a photographing enabling operation, which is different from the first launch operation and is a single operation with respect to a predetermined button (an operation of pressing an L button 14I or an R button 14J), for causing a photographing enabled state in which the photographing processing is executable by the photographing processing means in accordance with the photographing operation. The photographing operation acceptance means is means for, when the photographing enabling operation is performed, setting a state of the information-processing apparatus to the photographing enabled state, and accepting the photographing operation.

According to the above aspect, the information-processing apparatus is capable of executing two types of photographing functions, namely, a photographing function by executing the photographing application program and a photographing function by the photographing processing means which is realized by the launch program. Here, the photographing function by the photographing processing means is executed from the launch acceptance state by a single operation with respect to a predetermined button, and thus can be executed by an exceedingly simple operation. Therefore, the user can quickly cause the information-processing apparatus to be in a state in which photographing is possible (by a single operation) when the user desires to perform photographing using the information-processing apparatus, and thus the photographing function can be used by a simple operation.

Further, in the above first to third aspects, the predetermined button may be a button provided in the information-processing apparatus or a button displayed on a touch panel of the information-processing apparatus.

According to the above, the user can easily perform the photographing enabling operation by a button provided in the information-processing apparatus or a button on the touch panel.

Further, the photographing processing means may have only a part of a photographing function which is executable by executing the photographing application program.

According to the above, the photographing function of the photographing processing means which is relatively simple function can be quickly activated from the launch acceptance state. If the simple photographing function is launched only by a launch operation which is troublesome (more troublesome than a multifunctional photographing function), the user will not use the simple photographing function. However, according to the above aspect, since the simple photographing function can be launched by a simple operation, the user can be prompted to use even the simple photographing function. Thus, according to the above aspect, by setting launch operations having easiness according to use purpose with respect to two types of different photographing functions, respectively, the two types of photographing functions can be efficiently used.

Further, the launch program may include a launch function program (51) for launching the application program, and a photographing function program (52) for causing the computer to function as the photographing processing means. In this case, the photographing function program has a data size which is smaller than that of the photographing application program.

According to the above, by setting a program capable of being launched in the launch acceptance state to the photographing function program which has a smaller data size, a program for photographing can be quickly launched in the launch acceptance state.

It is noted that the present embodiment may be provided as an information- processing apparatus comprising each means described above.

As described above, according to the present embodiment, by making the photographing enabling operation the same as the photographing operation, a series of operations for shifting the state of the information-processing apparatus to the photographing enabled state and further performing photographing can be easily performed (the first aspect). Further, by the cancellation means, the photographing enabled state can be automatically canceled (the second aspect). Further, by making the photographing enabling operation a single operation with respect to a predetermined button, the photographing function by the photographing processing means can be executed by an exceedingly simple operation (the third aspect).

These and other features, aspects and advantages of the present embodiment will become more apparent from the following detailed description of the present embodiment when taken in conjunction with the accompanying drawings.

DESCRIPTION OF THE PREFERRED EMBODIMENTS

[Configuration of Information-Processing Apparatus]

Figure 1:
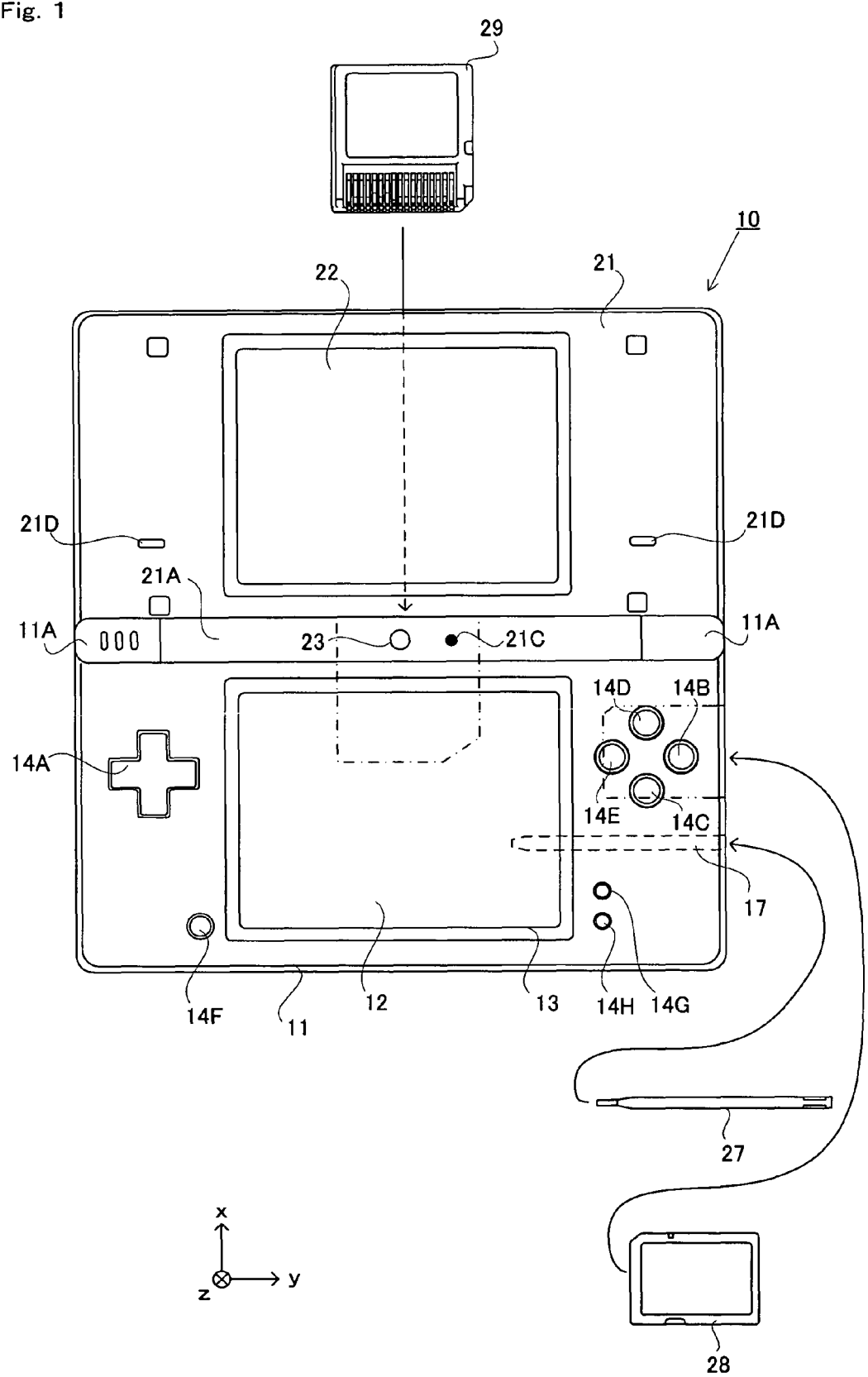
FIG. 1 is a view showing an external view of an information-processing apparatus.
Figure 2:
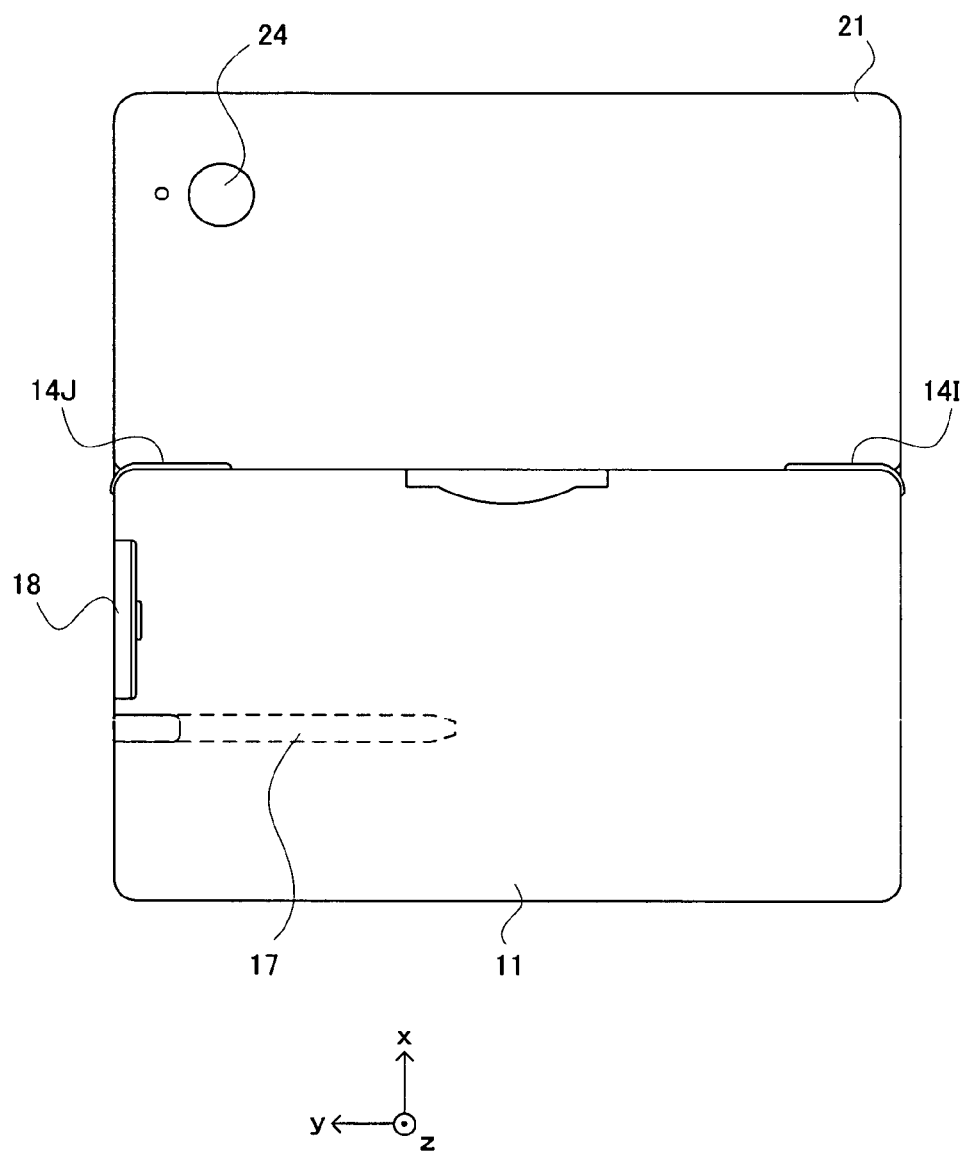
FIG. 2 is a view showing an external view of the information-processing apparatus.

The following will describe an information-processing apparatus according to an embodiment. FIGS. 1 and 2 are views each showing an external view of an information-processing apparatus 10. FIG. 1 is an external view of the information-processing apparatus 10 as viewed from a side, and FIG. 2 is an external view of the information-processing apparatus 10 as viewed from the opposite side. The hand-held information-processing apparatus 10 shown in FIGS. 1 and 2 takes an image with imaging means (a camera), displays the taken image on a screen, and stores data of the taken image. Further, the information-processing apparatus 10 is capable of executing various application programs such as a game, and the like in addition to an application program for executing photographing processing. With reference to FIGS. 1 and 2, the following will describe an external configuration of the information-processing apparatus 10.

The information-processing apparatus 10 is a foldable apparatus, and includes two housings, namely, a lower housing 11 and an upper housing 21 as shown in FIGS. 1 and 2. The lower housing 11 and the upper housing 21 are connected to each other so as to be capable of being opened or closed (foldable). In other words, axial portions 11A are provided at both ends of an upper side (a side on an x-axis positive side in the drawing) of the lower housing 11 in a left-right direction (in a y direction in the drawing), respectively, as shown in FIG. 1 (the axial portions 11A are structurally integral with the lower housing 11). Further, an axial portion 21A is provided in a center portion of a lower side (a side on an x-axis negative side in the drawing) of the upper housing 21 in the left-right direction (in the y direction in the drawing) as shown in FIG. 1 (the axial portion 21A is structurally integral with the upper housing 21). The axial portions 11A and the axial portion 21A are connected to each other by a hinge provided therein so as to be pivotable about an axis in the left-right direction. Thus, the lower housing 11 and the upper housing 21 are connected to each other so as to be pivotable about an axis in the left-right direction. FIGS. 1 and 2 show the information-processing apparatus 10 in an opened state. In an alternative embodiment, the information-processing apparatus 10 may not be of a foldable type, and may include one housing.

As shown in FIG. 1, the information-processing apparatus 10 includes two display devices, namely, an upper LCD (Liquid Crystal Display) 22 and a lower LCD 12. The upper LCD 22 is mounted in an inner surface of the upper housing 21 (which is a surface located on the inside of the information-processing apparatus 10 in a closed state), and the lower LCD 12 is mounted in an inner surface of the lower housing 11. Although an LCD is used as a display device in the present embodiment, any other display devices such as a display device using an EL (Electro Luminescence) may be used. In addition, the information-processing apparatus 10 can use a display device of any resolution. Although a case where the information-processing apparatus 10 includes the two display devices is described as an example in the present embodiment, in an alternative embodiment, the information-processing apparatus may include any number of display devices.

As shown in FIGS. 1 and 2, the information-processing apparatus 10 includes two cameras 23 and 24 as the imaging means. Each of the cameras 23 and 24 is accommodated in the upper housing 21. As shown in FIG. 1, the inner camera 23 is mounted in the inner surface of the upper housing 21. In the present embodiment, the inner camera 23 is mounted in the axial portion 21A of the upper housing 21. On the other hand, as shown in FIG. 2, the outer camera 24 is mounted in a surface opposite to the surface in which the inner camera 23 is mounted, namely, in an outer surface of the upper housing 21 (which is a surface located on the outside of the information-processing apparatus 10 in the closed state). In other words, in the present embodiment, the two cameras 23 and 24 are provided such that imaging directions thereof are opposite to each other. Thus, a user can take images in two different directions without changing a manner of holding the information-processing apparatus 10. For example, the user can take an image of a view seen from the information-processing apparatus 10 toward the user with the inner camera 23 as well as an image of a view seen from the information-processing apparatus 10 in a direction opposite to the user with the outer camera 24.

Although the case where the information-processing apparatus 10 includes the two cameras 23 and 24 as the imaging means is described as an example in the present embodiment, the information-processing apparatus 10 may include one camera, or three or more cameras. Further, a position at which a camera is mounted may be any position.

The information-processing apparatus 10 includes a plurality of buttons 14A to 14J as input devices. As shown in FIG. 1, the direction input button 14A, the button 14B, the button 14C, the button 14D, the button 14E, the power button 14F, the start button 14G, and the select button 14H are provided on the inner surface of the lower housing 11. Each of the buttons 14A to 14E, the start button 14G, and the select button 14H is used for performing various operations with respect to the information-processing apparatus 10. The power button 14F is used for turning on or off the power of the information-processing apparatus 10. Further, as shown in FIG. 2, the L button 14I is provided at a left end of the upper side of the lower housing 11 (at a left end as viewed from the inner surface side; on a y-axis negative side in the drawing), and the R button 14J is provided at a right end of the upper side (at a right end as viewed from the inner surface side; on a y-axis positive side in the drawing). The L button 14I and the R button 14J are used for performing a photographing operation (a shutter operation). Although not shown in the drawings, the information-processing apparatus 10 includes a volume button for adjusting volume of later-described speakers. For example, the volume button is provided on a left side surface of the lower housing 11.

The information-processing apparatus 10 further includes a touch panel 13, as shown in FIG. 1, as another input device in addition to the above buttons. The touch panel 13 is mounted on a screen of the lower LCD 12. The touch panel 13 may be of any type such as a resistive film type, an optical type (infrared type), or a capacitive coupling type. The touch panel 13 used in the present embodiment has the same resolution (detection accuracy) as that of the lower LCD 12. However, the resolution of the touch panel 13 and the lower LCD 12 may not necessarily be the same as each other. A touch pen 27 is usually used for performing an input with respect to the touch panel 13, but a finger of the user can be used for operating the touch panel 13 instead of the touch pen 27. In the present embodiment, the information-processing apparatus 10 determines a later-described dividing line in accordance with an input with respect to the touch panel 13. In a right side surface of the lower housing 11, an insertion opening 17 (indicated by a dotted line in FIGS. 1 and 2) is provided for accommodating the touch pen 27.

The information-processing apparatus 10 includes a microphone (a microphone 43 shown in FIG. 3) as a voice input device. The microphone 43 is accommodated in the upper housing 21. In the present embodiment, the microphone 43 is disposed in the axial portion 21A of the upper housing 21. In the inner surface of the upper housing 21, a microphone hole 21C is provided to allow the microphone to detect sound outside the information-processing apparatus 10. The microphone hole 21C is provided in the axial portion 21A of the upper housing 21.

The information-processing apparatus 10 includes the speakers (not shown) as sound output means. The speakers are accommodated in the upper housing 21. In the upper housing 21, sound holes 21D are provided for releasing sound from the speakers therethrough. The sound holes 21D are provided on both left and right sides of the upper LCD 22, respectively.

Further, as shown in FIG. 2, a cover 18 is provided on the right side surface of the lower housing 11 so as to be capable of being opened or closed. Inside the cover 18, an insertion opening (indicated by a two-dot chain line in FIG. 1) is provided so as to be capable of receiving a memory card 28 therein. In the insertion opening, a connector (not shown) is provided for electrically connecting the information-processing apparatus 10 to the memory card 28. The memory card 28 is inserted into the insertion opening to be connected to the connector. The memory card 28 is used, for example, for storing data of a taken image. Further, an application program (a later-described selected application program) which is executable by the information-processing apparatus 10 may be stored in the memory card 28.

Further, as shown in FIG. 2, on the upper side of the lower housing 11, an insertion opening (indicated by a chain line in FIG. 1) is provided so as to be capable of receiving a cartridge 29 therein. In the insertion opening, a connector (not shown) is provided for electrically connecting the information-processing apparatus 10 to the cartridge 29. The cartridge 29 is inserted into the insertion opening to be connected to the connector. For example, an application program (a later-described selected application program) which is executable by the information-processing apparatus 10 may be stored in the cartridge 29.

[Internal Configuration of Information-Processing Apparatus 10]

Figure 3:
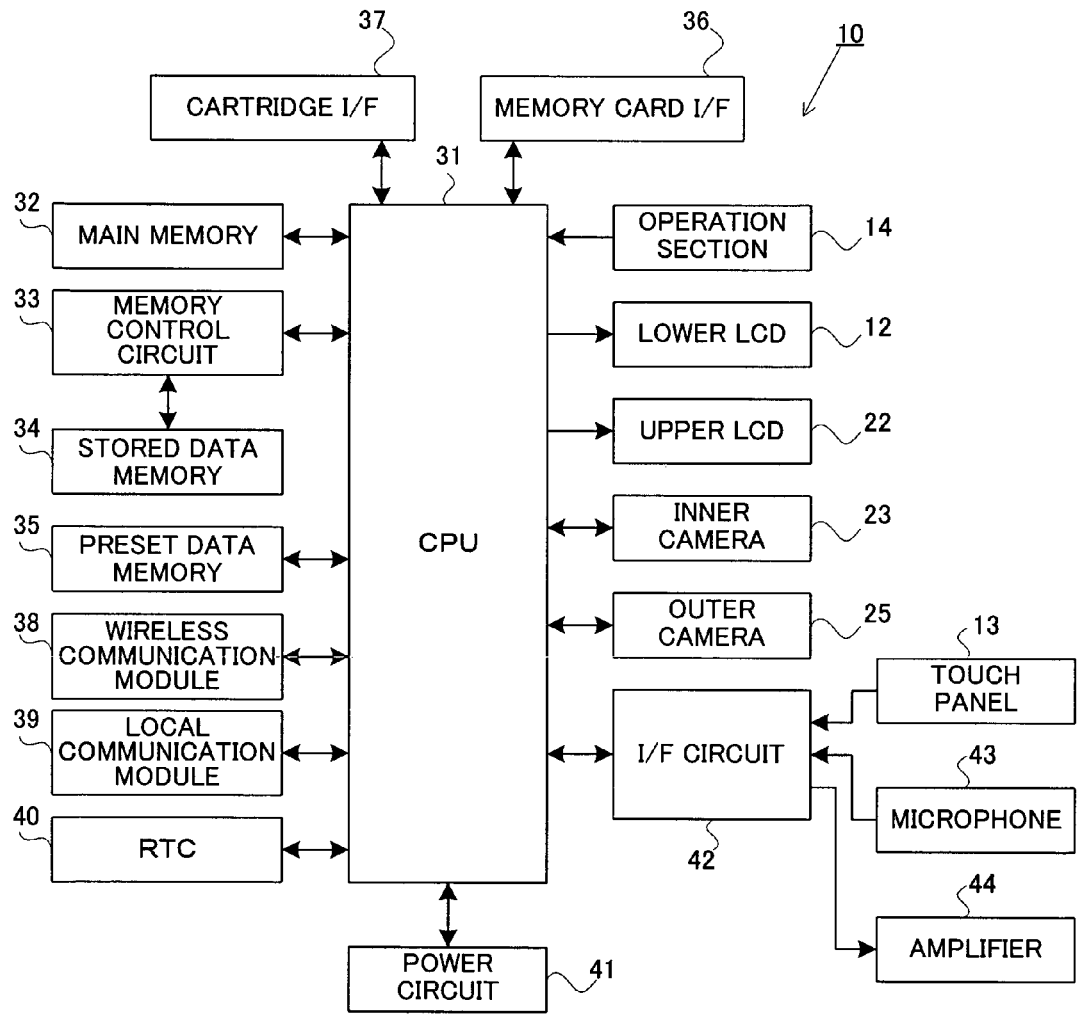
FIG. 3 is a block diagram showing an internal configuration of the information-processing apparatus.

With reference to FIG. 3, the following will describe an internal configuration of the information-processing apparatus 10. FIG. 3 is a block diagram showing the internal configuration of the information-processing apparatus 10. As shown in FIG. 3, the information-processing apparatus 10 includes electronic components including a CPU 31, a main memory 32, a memory control circuit 33, a stored data memory 34, a preset data memory 35, a memory card interface (memory card I/F) 36, a cartridge interface (cartridge I/F) 37, a wireless communication module 38, a local communication module 39, a real time clock (RTC) 40, a power circuit 41, an interface circuit (I/F circuit) 42, and the like. These electronic components are mounted on an electronic circuit substrate and accommodated in the lower housing 11. It is noted that various electronic circuits and a battery of the information-processing apparatus 10 may be accommodated in either the upper housing 21 or the lower housing 11.

The CPU 31 is information processing means for executing various programs (a later-described launch program, selected application programs, and the like). The main memory 32, the memory control circuit 33, and the preset data memory 35 are connected to the CPU 31. Further, the stored data memory 34 is connected to the memory control circuit 33.

The main memory 32 is storage means used as a work area and a buffer area of the CPU 31. In other words, the main memory 32 stores a (application) program executed by the CPU 31, and also stores various data used in processing executed by executing the program. In the present embodiment, for example, a PSRAM (Pseudo-SRAM) is used as the main memory 32. The stored data memory 34 is storage means for storing a program executable by the CPU 31, data of images taken by the cameras 23 and 24, and the like. The stored data memory 34 is constructed of, for example, a NAND flash memory. In the present embodiment, the above various programs are stored in the stored data memory 34, and when the CPU 31 executes a program, the program to be executed is read out therefrom into the main memory 32. It is noted that the program executed by the CPU 31 may not be stored in advance in the stored data memory 34, may be obtained from the memory card 28, or may be obtained from a later-described external apparatus by means of communication with the external apparatus.

The memory control circuit 33 is a circuit for controlling reading of data from the stored data memory 34 or writing of data to the stored data memory 34 in accordance with an instruction from the CPU 31. The preset data memory 35 is storage means for storing data (preset data) of various parameters which are set in advance in the information-processing apparatus 10, and the like. A flash memory connected to the CPU 31 via an SPI (Serial Peripheral Interface) bus can be used as the preset data memory 35.

The memory card I/F 36 is connected to the CPU 31. The memory card I/F 36 reads out data from the memory card 28 mounted to the connector or writes data to the memory card 28 in accordance with an instruction from the CPU 31. In the present embodiment, data of images taken by the cameras 23 and 24 are written to the memory card 28, and image data stored in the memory card 28 are read out from the memory card 28 to be stored in the stored data memory 34.

The cartridge I/F 37 is connected to the CPU 31. The cartridge I/F 37 reads out data from the cartridge 29 mounted to the connector or writes data to the cartridge 29 in accordance with an instruction from the CPU 31. In the present embodiment, an application program (a later-described selected application program) which is executable by the information-processing apparatus 10 is read out from the cartridge 29 to be executed by the CPU 31, and data regarding the application program (e.g. saved data of a game, and the like) is written to the cartridge 29.

The wireless communication module 38 functions to connect to a wireless LAN device by a method conformed to the standard of IEEE802.11.b/g. The local communication module 39 functions to wirelessly communicate with an information-processing apparatus of the same type by a predetermined communication method. The wireless communication module 38 and the local communication module 39 are connected to the CPU 31. The CPU 31 is capable of receiving data (data of taken images, an application program, and the like) from and sending data (data of taken images, an application program, and the like) to another apparatus via the Internet by using the wireless communication module 38, and capable of receiving data from and sending data to another information-processing apparatus of the same type by using the local communication module 39.

The RTC 40 and the power circuit 41 are connected to the CPU 31. The RTC 40 counts a time, and outputs the time to the CPU 31. The CPU 31 calculates a current time (date) based on the time counted by the RTC 40. The power circuit 41 controls electric power from a power supply (the battery) of the information-processing apparatus 10 to supply the electric power to each electronic component of the information-processing apparatus 10.

The information-processing apparatus 10 includes the microphone 43 and an amplifier 44. The microphone 43 and the amplifier 44 are connected to the I/F circuit 42. The microphone 43 detects sound, and outputs a sound signal to the I/F circuit 42. The amplifier 44 amplifies the sound signal from the I/F circuit 42, and causes the speakers (not shown) to output the sound signal. The I/F circuit 42 is connected to the CPU 31. The touch panel 13 is connected to the I/F circuit 42. The I/F circuit 42 includes a sound control circuit for controlling the microphone 43 and the amplifier 44 (the speakers) and a touch panel control circuit for controlling the touch panel. The sound control circuit performs A/D conversion or D/A conversion on the sound signal, and converts the sound signal into sound data in a predetermined format. The touch panel control circuit generates touch position data in a predetermined format based on a signal from the touch panel 13, and outputs the touch position data to the CPU 31. The touch position data indicates coordinates of a position (input position) on an input surface of the touch panel 13 at which an input is performed. The touch panel control circuit reads a signal from the touch panel 13 and generates touch position data every a predetermined time period. The CPU 31 can recognize an input position with respect to the touch panel 13 by obtaining the touch position data.

An operation section 14 includes the above buttons 14A to 14J and the above volume button, and is connected to the CPU 31. The operation section 14 outputs operation data indicative of an input state with respect to each button (whether or not each button is pressed) to the CPU 31. The CPU 31 obtains the operation data from the operation section 14, and executes processing in accordance with an input with respect to the operation section 14.

The cameras 23 and 24 are connected to the CPU 31. Each of the cameras 23 and 24 takes an image in accordance with an instruction from the CPU 31, and outputs data of the taken image to the CPU 31. In the present embodiment, the CPU 31 gives an imaging instruction to the camera 23 or 24, and the camera which has received the imaging instruction takes an image and sends image data to the CPU 31 every a predetermined time period.

The LCDs 12 and 22 are connected to the CPU 31. Each of the LCDs 12 and 22 displays an image thereon in accordance with an instruction from the CPU 31. In the present embodiment, the CPU 31 causes a taken image obtained from the camera 23 or 24 and an explanation image for explaining a manner of operation, and the like to be displayed on the LCDs 12 and 22.

[Outline of Processing in Information-Processing Apparatus 10]

Figure 4:
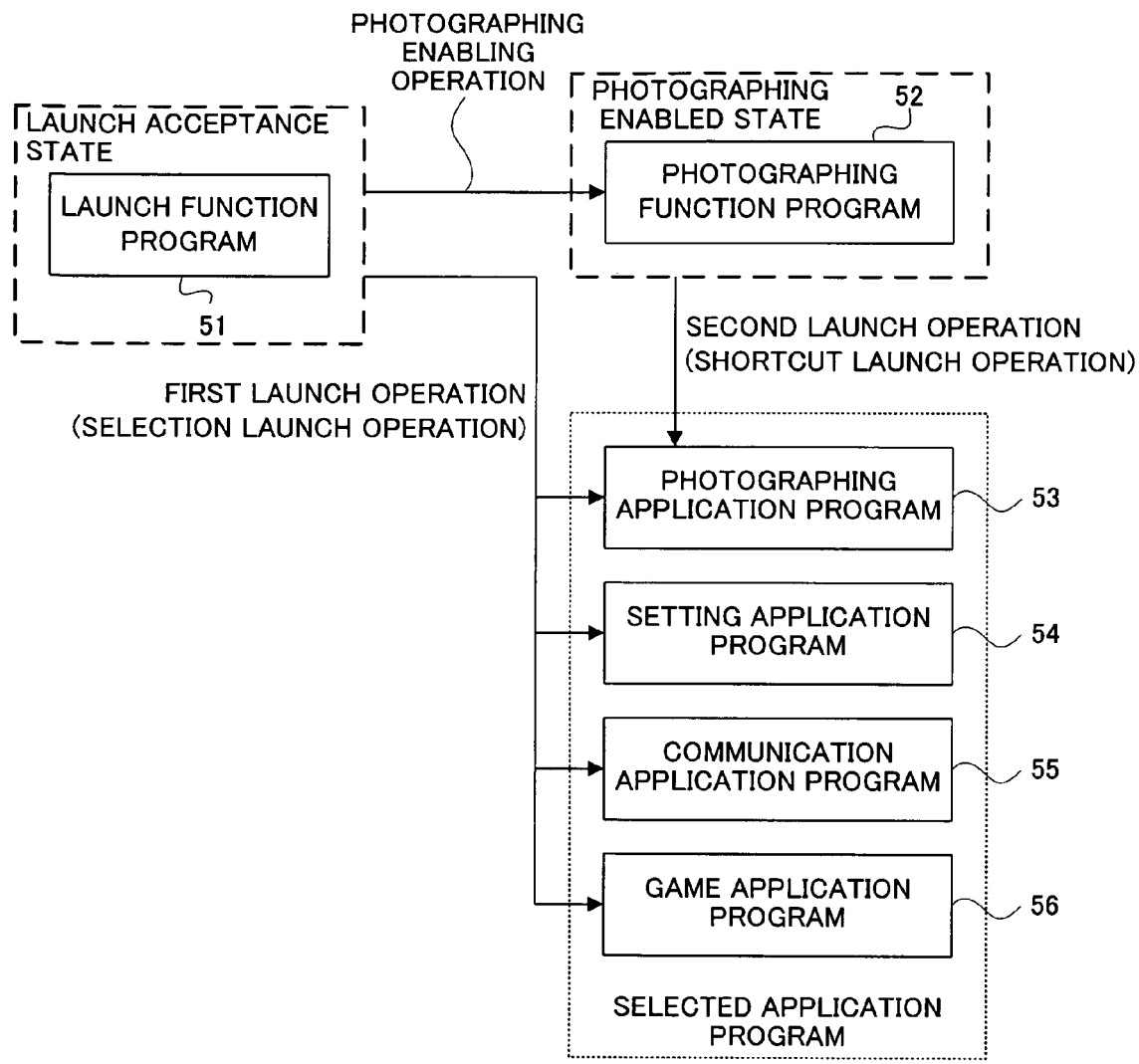
FIG. 4 is a view for explaining a method of launching each application program in the information-processing apparatus.

With reference to FIG. 4, the following will describe an outline of processing executed by the information-processing apparatus 11. The information-processing apparatus 10 is capable of executing various processing using a plurality of application programs having various functions, in addition to executing the photographing processing. The following will describe a method of launching each application.

FIG. 4 is a view for explaining a method of launching each application program in the information-processing apparatus 10. The information-processing apparatus 10 selectively launches an application program desired by the user among a plurality of application programs 53 to 56. The application programs 53 to 56 which are selectively launched by the information-processing apparatus 10 may be referred to as selected application programs.

The above plurality of selected application programs includes the photographing application program 53. The photographing application program 53 is an application program for performing photographing with the camera 23 or 24. The photographing application program 53 is stored in advance (pre-installed) in the information-processing apparatus 10.

Further, the above plurality of selected application programs includes application programs having various functions in addition to the above photographing application program 53. As shown in FIG. 4, for example, the above plurality of selected application programs includes the setting application program 54 for performing various settings of the information-processing apparatus 10, the communication application program 55 for the information-processing apparatus 10 to perform communication with an external apparatus, and the game application program 56 for performing a predetermined game. Further, in the present embodiment, the information-processing apparatus 10 stores other selected application programs in addition to the four selected application programs 53 to 56 as shown in FIG. 4.

The above plurality of selected application programs may include a program which is not pre-installed in the information-processing apparatus 10. When executed, for example, a selected application program may be downloaded from another apparatus via a network such as the Internet, and the like, or may be read from a detachable storage medium such as the memory card 28 or the cartridge 29 into a memory within the information-processing apparatus 10.

Further, in the present embodiment, processing of selectively launching the selected application programs 53 to 56 is executed by a launch function program 51. The launch function program 51 is one of programs included in a launch program (a launch program 61 shown in FIG. 5) according to the present invention. The launch function program 51 is a program for selecting a selected application program to be launched among the plurality of selected application programs 53 to 56. The launch function program 51 is a program called as launcher. The selected application programs 53 to 56 become objects for a selection operation which can be performed by the user by executing the launch function program 51, and are selected by the selection operation to be executed.

In addition, the information-processing apparatus 10 includes (1) first launch operation acceptance means, (2) first launch means, (3) photographing processing means, (4) photographing enabling operation acceptance means, (5) state setting means, (6) second launch operation acceptance means, (7) second launch means, and (8) cancellation means. In the present embodiment, each of these means is realized by a program (the launch program 61), which is executed by a computer (the CPU 31) of the information-processing apparatus 10, causing the computer to function as the means. In an alternative embodiment, the information-processing apparatus 10 may not include each means of the above (6) to (8).

(1) First Launch Operation Acceptance Means

The first launch operation acceptance means accepts a first launch operation for selectively launching the above plurality of application programs (later-described steps S6 and S11). Thus, the user can select a selected application program to be desired to be launched (executed) for execution. The first launch operation is an operation for selectively launching the selected application program, and thus, hereinafter, the first launch operation may be referred to as a "selection launch operation". It is noted that a state of accepting the first launch operation (a state where it is possible to perform the first launch operation) is referred to as a "launch acceptance state" (FIG. 4).

(2) First Launch Means

When the first launch operation is performed, the first launch means launches an application program which is selected by the first launch operation among the above plurality of application programs (a later-described step S12). In other words, for example, when the photographing application program 53 is selected by the first launch operation, the photographing application program 53 is launched.

In the present embodiment, the launch acceptance state corresponds to a state where a so-called menu screen is displayed, and the information-processing apparatus 10 is initially in the launch acceptance state after being started up (a power is turned on) (except for start-up for the first time). Although details will be described later, the menu screen (FIG. 7) showing icons indicating the selected application programs 53 to 56, respectively, is displayed on the lower LCD 12 in the launch acceptance state in the present embodiment. The user can launch a selected application program by performing an operation of touching a position of the icon with respect to the touch panel 13 as the first launch operation.

(3) Photographing Processing Means

The photographing processing means executes photographing processing (a later-described step S10). The photographing processing is processing of storing a taken image by the camera 23 or 24 in storage means of the information-processing apparatus in accordance with a predetermined photographing operation. In the present embodiment, the photographing operation is an operation of pressing a predetermined button (more specifically, the L button 14I or the R button 14J). The above photographing processing means is means realized by executing the launch program 61 according to the present invention by the CPU 31 of the information-processing apparatus 10, and is different from means realized by the above photographing application program 53. It is noted that the photographing processing means only has to have at least a function to execute photographing processing (a function to store a taken image by the camera 23 or 24 in the storage means of the information-processing apparatus 10), but may have other functions regarding photographing (e.g. a function to display a stored image, and a function to edit a stored image).

In the present embodiment, the launch program 61 according to the present invention includes a photographing function program 52 shown in FIG. 4. The above photographing processing means is realized by executing the photographing function program 52 by the CPU 31 of the information-processing apparatus 10. In other words, in the present embodiment, the information-processing apparatus 10 stores two types of programs for executing photographing processing, namely, the photographing function program 52 and the photographing application program 53.

Further, although, in the present embodiment, the launch program 61 includes the two types of programs, the launch function program 51 and the photographing function program 52, the launch function program 51 and the photographing function program 52 may be incorporated into one program. The launch program 61 (the launch function program 51 and the photographing function program 52) is pre-installed in the information-processing apparatus 10.

Here, a function by the photographing processing means is different from a function which is enabled by executing the photographing application program 53. In the present embodiment, the photographing processing means has only a part of the function which the photographing application program 53 has. In an alternative embodiment, the photographing processing means may have a function which the photographing application program 53 does not have.

(4) Photographing Enabling Operation Acceptance Means

In the launch acceptance state, the photographing enabling operation acceptance means accepts a photographing enabling operation for causing (a state of the information-processing apparatus 10 to be) a photographing enabled state (the later-described steps S6 and S9). The photographing enabled state is a state where it is possible to execute photographing processing by the above photographing processing means in accordance with the above photographing operation (a state of accepting the photographing enabling operation). In other words, in the launch acceptance state, the user can launch the selected application programs 53 to 56 by the first launch operation, and can also activate a photographing function by the photographing processing means by the photographing enabling operation (FIG. 4). In the present embodiment, the photographing enabling operation is the same as the above photographing operation. More specifically, the photographing enabling operation and the photographing operation each are a single operation with respect to a predetermined button (an operation of once pressing the L button 14I or the R button 14J). In an alternative embodiment, the predetermined button is not limited to a button provided in the information-processing apparatus 10, and may be a button (a button image) displayed on the touch panel 13 (the first LCD 12) of the information-processing apparatus 10.

In the present embodiment, the photographing enabled state is a state in which photographing processing is executed in accordance with a photographing operation being performed. However, as an optional additive configuration, the information-processing apparatus 10 may perform the following processing in the photographing enabled state. In the photographing enabled state, the information-processing apparatus 10 may display a live image (an image taken in real time; see FIG. 9) and/or an image for explaining an operation regarding photographing. Further, in the photographing enabled state, the information-processing apparatus 10 may stop processing of launching an application by the first launch operation acceptance means.

In the present embodiment, the photographing enabling operation is an operation of which an operation manner is different from an operation manner of the first launch operation. More specifically, in the present embodiment, the first launch operation is an input operation with respect to the touch panel 13 while the photographing enabling operation is an operation of pressing a predetermined button (more specifically, the L button 14I or the R button 14J). It is noted that the phrase "an operation manner is different" means that "an input device to be operated is different", and also means that an operation performed with respect to the same input device is different. In an alternative embodiment, the first launch operation and the photographing enabling operation may be operations of touching different positions on the touch panel 13, may be operations of inputting different lines with respect to the touch panel 13, or may be operations of pressing different buttons. For easily and quickly performing activation of the photographing function (launch of the photographing function program 52) by the photographing processing means, the photographing enabling operation is preferably an simple operation such as an operation of pressing a predetermined button.

(5) State Setting Means

When the above photographing enabling operation is performed, the state setting means sets the state of the information-processing apparatus 10 to the photographing enabled state (a step S10 which is executed in the case of YES at a later-described step S9). In other words, when the photographing enabling operation is performed, the state of the information-processing apparatus 10 becomes the photographing enabled state (FIG. 4). Thus, a photographing operation by the user is possible. Therefore, the user can take a photograph (can cause the information-processing apparatus 10 to execute the photographing processing) by performing the photographing operation after the photographing enabling operation is performed.

In the present embodiment, the launch acceptance state and the photographing enabled state have an exclusive relation with each other, and the information-processing apparatus 10 is alternatively in either the launch acceptance state or the photographing enabled state. In other words, the photographing operation (in the photographing enabled state) is not accepted in the launch acceptance state while the first launch operation (in the launch acceptance state) is not accepted in the photographing enabled state. However, in an alternative embodiment, the launch acceptance state and the photographing enabled state may not have an exclusive relation with each other, and it may be possible for the information-processing apparatus 10 to be in the launch acceptance state and in the photographing enabled state. For example, the information-processing apparatus 10 may accept the first launch operation in the photographing enabled state.

As described above, according to the present embodiment, by the configurations of the above (1) to (5), the information-processing apparatus 10 is capable of executing two types of photographing functions, namely, a photographing function by executing the photographing application program 53 and a photographing function by the photographing processing means. For performing photographing by the photographing processing means from the launch acceptance state, the user only has to perform the photographing enabling operation and the photographing operation which are the same as each other. In other words, the user can perform photographing only by performing the same operation twice (typically, only by pressing the same button twice), and can perform photographing by an exceedingly simple operation.

Further, in the case where the photographing enabling operation is a single operation with respect to a predetermined button, the photographing function by the photographing processing means can be executed from the launch acceptance state by a single operation with respect to a predetermined button, and hence can be executed by an exceedingly simple operation. Thus, when the user desires to perform photographing using the information-processing apparatus 10, the use can quickly set the state of the information-processing apparatus 10 to a state where photographing is possible by once pressing the predetermined button.

(6) Second Launch Operation Acceptance Means

In the above photographing enabled state, the second launch operation acceptance means accepts a second launch operation for launching the photographing application program 53 (the later-described steps S24 and S28). Thus, in the photographing enabled state, the user can perform the second launch operation in addition to the photographing operation. The second launch operation is an operation for launching the photographing application program 53 directly from the photographing enabled state without returning to the launch acceptance state, and thus may be referred to as a "shortcut launch operation".

Figure 9:
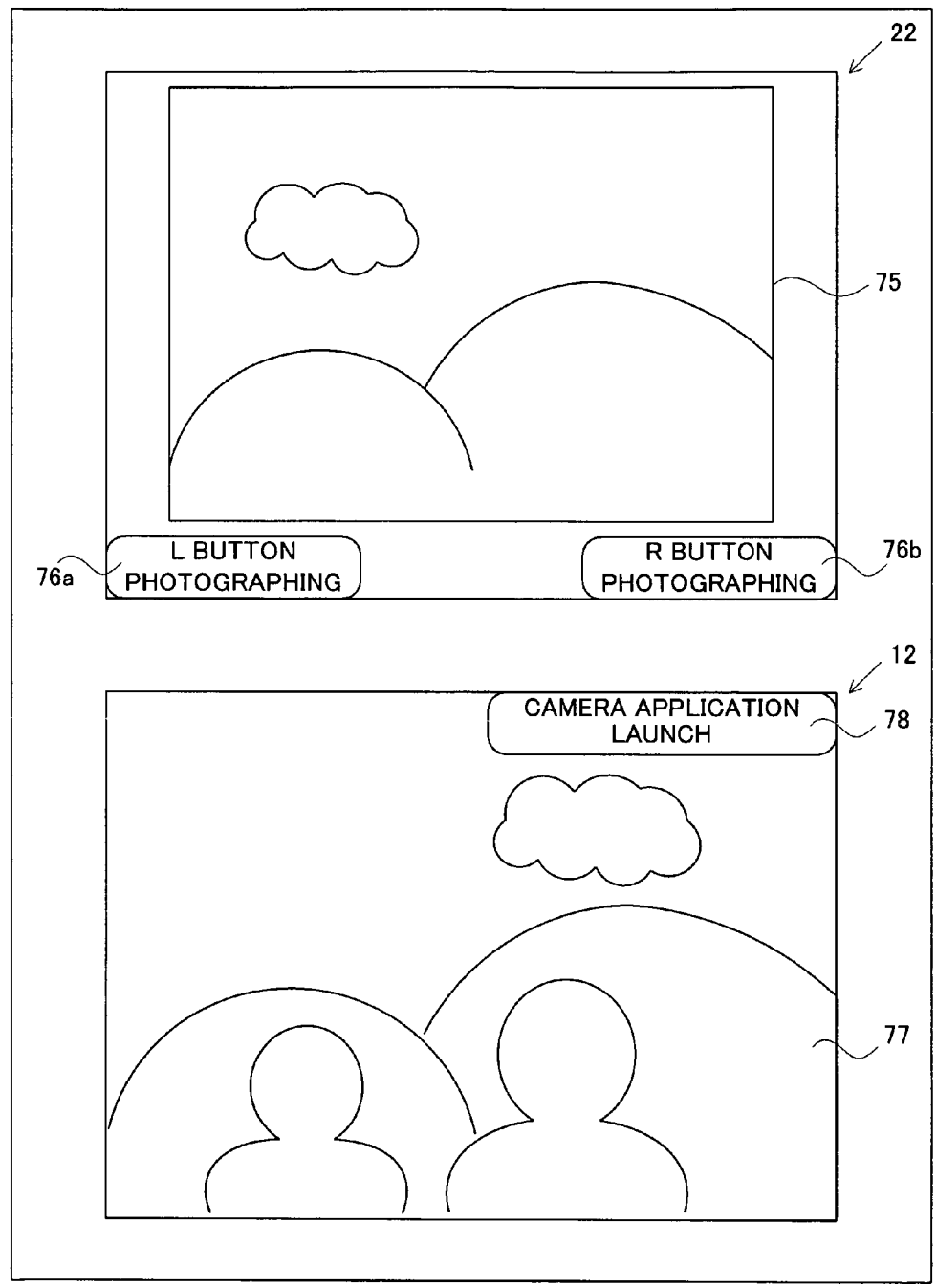
FIG. 9 is a view showing an example of images displayed in a photographing enabled state.

In the present embodiment, in the photographing enabled state, an image being taken by the camera 23 or 24 is displayed on the lower LCD 12 while a button image (a button image 78 shown in FIG. 9) for performing the second launch operation is displayed on the lower LCD 12 (FIG. 9). The user can perform the second launch operation by performing an operation of touching the button image. For easily and quickly performing launch of the photographing application program 53, the second launch operation is preferably a simple operation.

(7) Second Launch Means

When the above second launch operation is performed, the second launch means launches the photographing application program 53 (a later-described step S30). Thus, the user can launch the photographing application program 53 in either the launch acceptance state or the photographing enabled state. The photographing application program 53 is launched (executed) by either the first launch operation in the launch acceptance state or the second launch operation in the photographing enabled state.

(8) Cancellation Means

In the above photographing enabled state, the cancellation means automatically cancels the photographing enabled state in accordance with satisfaction of a predetermined condition (simplified photographing processing is terminated in the case of Yes at a later-described S25). The predetermined condition is, for example, a photographing operation being performed a predetermined number of times in the photographing enabled state (execution of photographing processing a predetermined number of times), elapse of a predetermined time period from a time of start of the photographing enabled state, and the like. In the present embodiment, the photographing enabled state is automatically cancelled in accordance with a single execution of photographing processing in the photographing enabled state. In other words, when a photographing operation is performed in the photographing enabled state, the photographing enabled state is cancelled (after the photographing processing is terminated). In the present embodiment, as a result of cancellation of the photographing enabled state, the state of the information-processing apparatus 10 is shifted to the launch acceptance state.

According to the above cancellation means, the photographing enabled state is automatically cancelled without performing a (dedicated) operation for canceling the photographing enabled state. Especially, in the present embodiment, when the user performs a photographing operation once in the photographing enabled state, the state of the information-processing apparatus returns to the launch acceptance state. Thus, even a novice user who has not read an instruction manual, and the like can naturally return to the launch acceptance state by performing a photographing operation. Therefore, a state that "the user does not know how to return from the photographing enabled state to the launch acceptance state" can be prevented, and a user-friendly information-processing apparatus can be provided.

As described above, according to the present embodiment, in the launch acceptance state, the user can launch the selected application programs 53 to 56 by the selection launch operation (the first launch operation), and also can execute the photographing function by the photographing processing means by the photographing enabling operation. In addition, in the photographing enabled state where it is possible to perform photographing by the photographing function, the user can launch the photographing application program 53 by the shortcut launch operation (the second launch operation). Thus, even while performing photographing by the photographing processing means, the user can easily and quickly launch the photographing application program 53 by the shortcut launch operation. In other words, according to the present embodiment, in the case where the user desires to use a function (of the photographing application program 53) which the photographing processing means does not have during photographing by the photographing processing means, the user can easily and quickly use the function by the shortcut launch operation.

[Detail of Processing in Information-Processing Apparatus 10]

With reference to FIGS. 5 to 17, the following will describe a detail of the processing executed by the information-processing apparatus 10. First, with reference to FIG. 5, data used in the processing in the information-processing apparatus 10 will be described.

Figure 5:
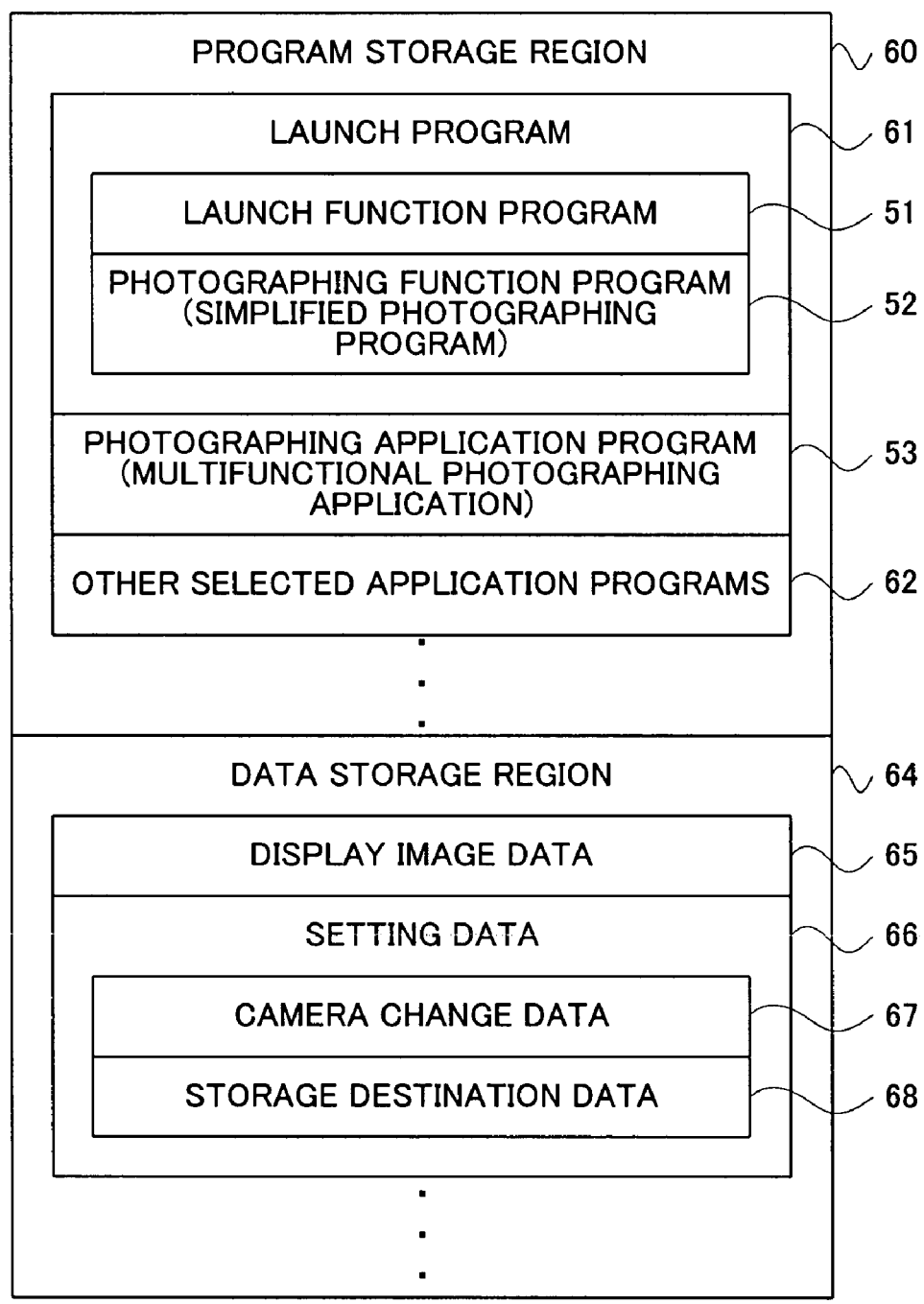
FIG. 5 is a view showing main data stored in a main memory 32 of the information-processing apparatus.

FIG. 5 is a view showing main data stored in the main memory 32 of the information-processing apparatus 10. As shown in FIG. 5, a program storage region 60 and a data storage region 64 are provided in the main memory 32.

In the program storage region 60, various programs (application programs) executed by the CPU 31 are stored. More specifically, the launch program 61, the photographing application program 53, and other selected application programs 62, and the like are stored in the program storage region 60. These programs are read out from the stored data memory 34, the memory card 28, or the cartridge 29 to be stored in the main memory 32 at an appropriate timing after start-up of the information-processing apparatus 10 (e.g. at a timing of launching a program).

The launch program 61 is a program for executing main processing in the information-processing apparatus 10. The launch program 61 is read into the main memory to be executed after the start-up of the information-processing apparatus 10. The launch program 61 includes the above launch function program 51 and the above photographing function program 52.

The launch function program 51 is a program for selecting a selected application program to be launched as described above.

The photographing function program 52 is a program which is not a selected application program, and is a program for executing the photographing processing. In the present embodiment, the photographing function program 52 has only a part of the function which the photographing application program 53 has. In other words, in the present embodiment, the photographing function program 52 is a relatively simple functional photographing processing program, and the photographing application program 53 is a relatively multifunctional photographing processing program. Further, the photographing function program 52 has a data size which is smaller than that of the photographing application program 53. It is noted that since the programs 52 and 53 have a common function, a part of their data may be commoditized and stored. Hereinafter, the relatively simple functional photographing function program 52 may be referred to as a "simplified photographing program 52", and the relatively multifunctional photographing application program 53 may be referred to as a "multifunctional photographing application program 53".

In the present specification, the phrase "(relatively) simple functional" includes both meaning of having (relatively) few functions and meaning of having a (relatively) low function, and the phrase "(relatively) multifunctional" includes meaning of having relatively many functions as well as meaning of having a (relatively) high function. In other words, the simplified photographing program 52 may have a relatively low function (e.g. photographing with a small number of pixels, a small number of types of stamps which can be used in editing a taken image, and the like) while the multifunctional photographing application program 53 may have a relatively high function (e.g. photographing with a large number of pixels, a large number of types of stamps which can be used in editing a taken image, and the like). Further, the simplified photographing program 52 may have relatively few functions (e.g. adjustment of exposure and white balance is impossible, a predetermined editing operation with respect to a taken image is impossible, and the like) while the multifunctional photographing application program 53 may have relatively many functions (e.g. adjustment of exposure and white balance is possible, a predetermined editing operation with respect to a taken image is possible, and the like).

Further, the other selected application programs 62 are selected application programs other than the multifunctional photographing application program 53, and include the above setting application program 54, the above communication application program 55, the above game application program 56, and the like.

The selected application programs (including the multifunctional photographing application program 53) are stored in the stored data memory 34 or the memory card 28, and read out into the main memory 32 when launched. It is noted that the selected application programs may be obtained (downloaded) from an external apparatus by means of communication to be stored in the stored data memory 34.

Meanwhile, in the data storage region 64, display image data 65, setting data 66, and the like are stored. In addition to these data 65 and 66, various data used in the processing in the information-processing apparatus 10 are stored in the data storage region 64.

The display image data 65 is data indicative of a display image. Here, in the present embodiment, one of stored images which are taken in the past is displayed on the menu screen, and a image being displayed is referred to as a display image. More specifically, the display image data 65 indicates a file name, and the like, of a display image. Although a detail of a method of selecting a display image will be described later, a later-described favorite image, an image immediately after photographing (storing) is performed by the simplified photographing program 52, and the like are selected as a display image in the present embodiment.

The setting data 66 is data indicative of setting information used in each program for photographing (the simplified photographing program 52 and the multifunctional photographing application program 53). The setting data 66 is passed as an argument to each of the programs 52 and 53 at a time of launching each of the programs 52 and 53 for photographing. The setting data 66 includes a camera change data 67 and a storage destination data 68.

The camera change data 67 indicates a camera for taking an image among the inner camera 23 and the outer camera 24. In other words, the camera change data 67 is data indicative of either the inner camera 23 or the outer camera 24.

The storage destination data 68 indicates a storage destination of a taken image (referred to as a stored image) to be stored by the photographing operation. In the present embodiment, a taken image to be stored by the photographing operation is stored in the stored data memory 34 or the memory card 28. Thus, the storage destination data 68 indicates either the stored data memory 34 or the memory card 28.

Figure 17:
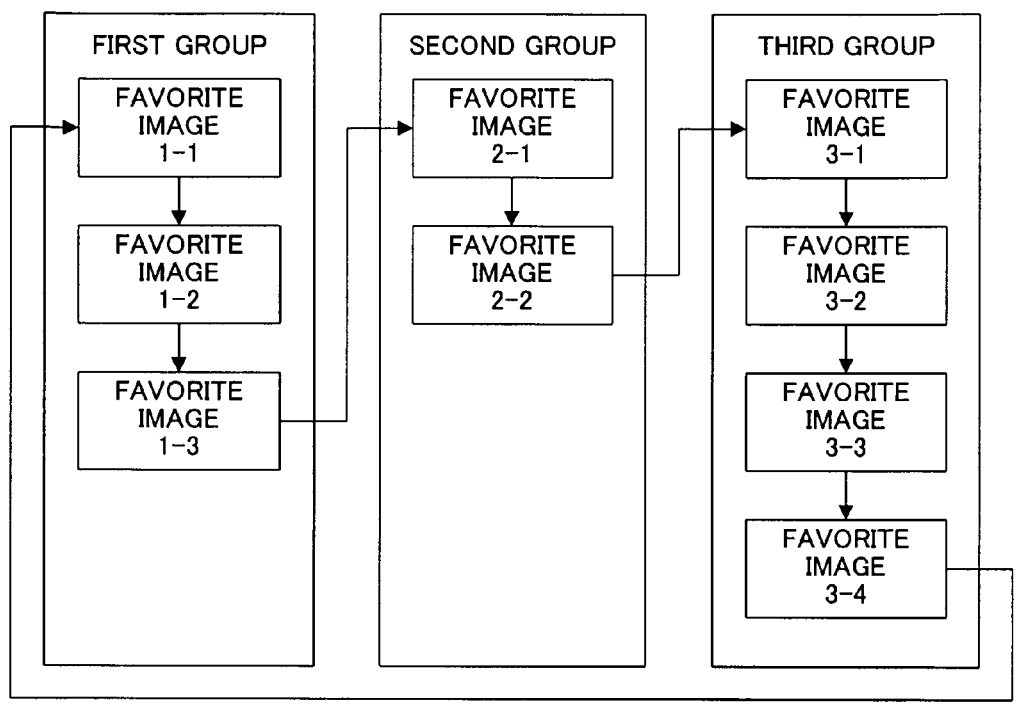
FIG. 17 is a view showing a method of changing a display image at a step S73 shown in FIG. 16.

It is noted that information such as a file name, and the like is attached to the stored image, and information regarding favorite is also attached to the stored image. Here, in the present embodiment, the user can set some of stored images as "favorite" (a later-described step S46). Hereinafter, a stored image which is set as favorite is referred to as a "favorite image". Information indicative of "favorite" is added to data of a favorite image. In addition, in the present embodiment, information indicative of any of first to third groups is added to the data of the favorite image. In other words, in the present embodiment, favorite images can be divided into the first to third groups, and managed (FIG. 17).

Figure 6:
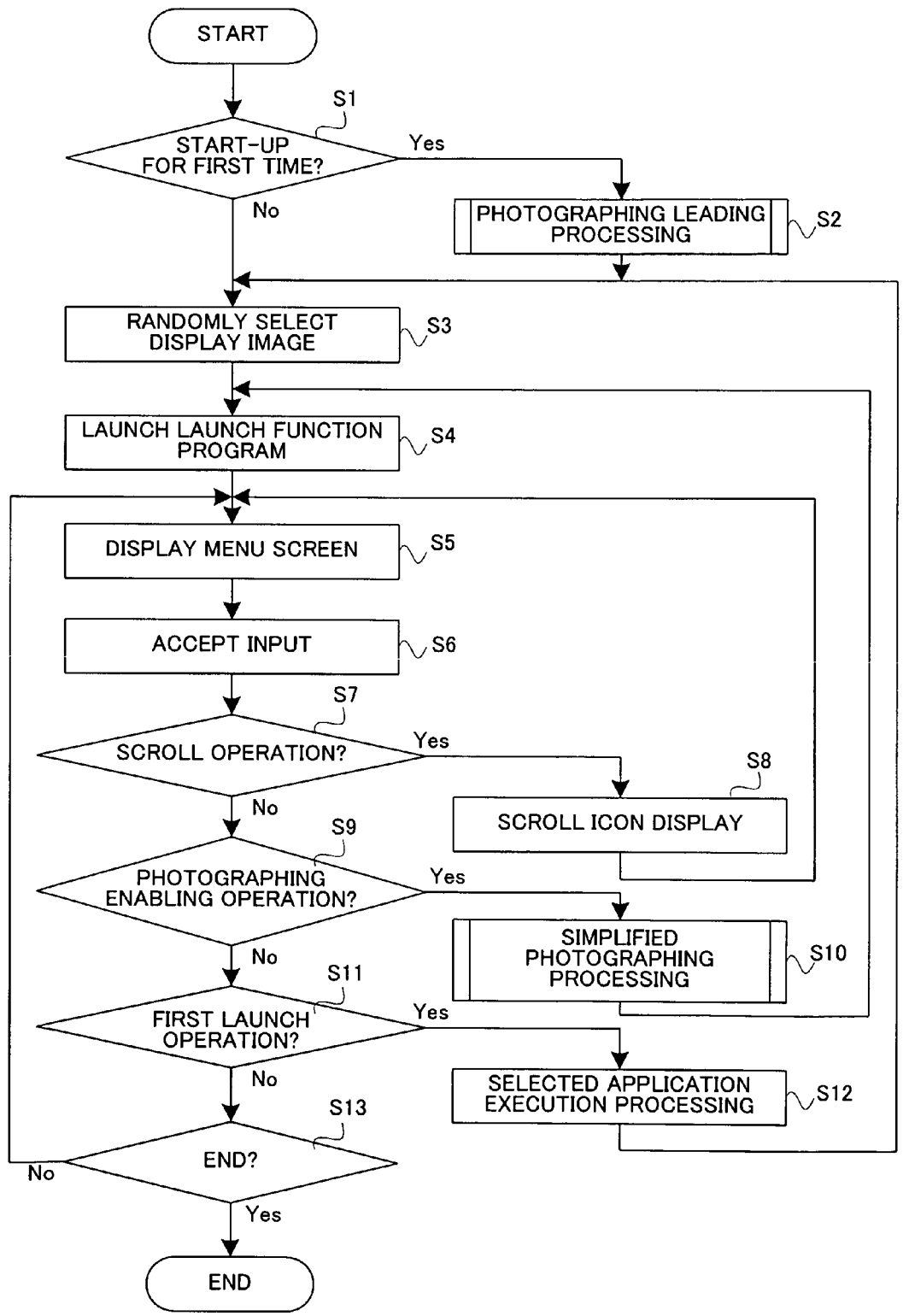
FIG. 6 is a main flow chart showing a procedure of processing in the information-processing apparatus.

With reference to FIGS. 6 to 17, the following will describe a procedure of the processing in the information-processing apparatus 10. FIG. 6 is a main flow chart showing the procedure of the processing in the information-processing apparatus 10. When the power is applied to the information-processing apparatus 10 by pressing the power button 14F, the CPU 31 of the information-processing apparatus 10 initializes the main memory 32, and the like, and then starts executing the launch program 61. Thus, processing at subsequent steps S1 to S13 is started.

At the step S1, the CPU 31 determines whether or not the information-processing apparatus 10 is started up for the first time. The determination at the step S1 can be made, for example, by storing time and date of starting up the information-processing apparatus 10 last time. In other words, if time and date of the last start-up have been stored, it can be determined that the start-up of the information-processing apparatus 10 this time is not a start-up for the first time. On the other hand, if the time and the date of the last start-up have not been stored, it can be determined that the start-up of the information-processing apparatus 10 this time is the start-up for the first time. When a result of the determination at the step S1 is positive, the processing at the step S2 is executed. On the other hand, when the result of the determination at the step S1 is negative, the processing at the step S2 is skipped, and the processing at the step S3 is executed.

At the step S2, the CPU 31 executes photographing leading processing. The photographing leading processing is processing for leading the user to experience a photographing operation with a simple function. In other words, in the photographing leading processing, the user is caused to select whether to perform photographing processing using the above simplified photographing program 52. When the user selects to perform the photographing processing, the user is caused to experience a simple photographing operation by the above simplified photographing program 52. A detail of the photographing leading processing will be described later using FIG. 15. The CPU 31 executes the processing at the step S3 subsequent to the step S2.

At the step S3, the CPU 31 selects a display image among favorite images in a random manner. More specifically, the CPU 31 selects one favorite image among favorite images stored in the stored data memory 34 in a random manner, and stores data indicative of information (e.g. a file name) identifying the selected favorite image as the display image data 65 in the main memory 32. Subsequent to the step S3, the processing at the step S4 is executed.

At the step S4, the CPU 31 launches the launch function program 51. In other words, the CPU 31 reads out the launch function program 51 from the stored data memory 34 to be stored in the main memory 32, and executes the launch function program 51. The processing at the step S5 and thereafter is executed by the CPU 31 executing the launch function program 51. Further, in the present embodiment, the CPU 31 reads out the simplified photographing program 52 into the main memory 32 along with the launch function program 51 at a timing of reading out the launch function program 51. In an alternative embodiment, the simplified photographing program 52 may be read out into the main memory 32 at a timing of executing later-described simplified photographing processing (the step S11). Subsequent to the step S4, the processing at the step S5 is executed.

At the step S5, the CPU 31 displays a menu screen. The menu screen is a screen (an image) for causing the user to select a selected application program to be launched among the selected application programs. The launch acceptance state shown in FIG. 4 is a state where the menu screen is displayed. The following will describe the menu screen in the present embodiment using FIG. 7.

Figure 7:
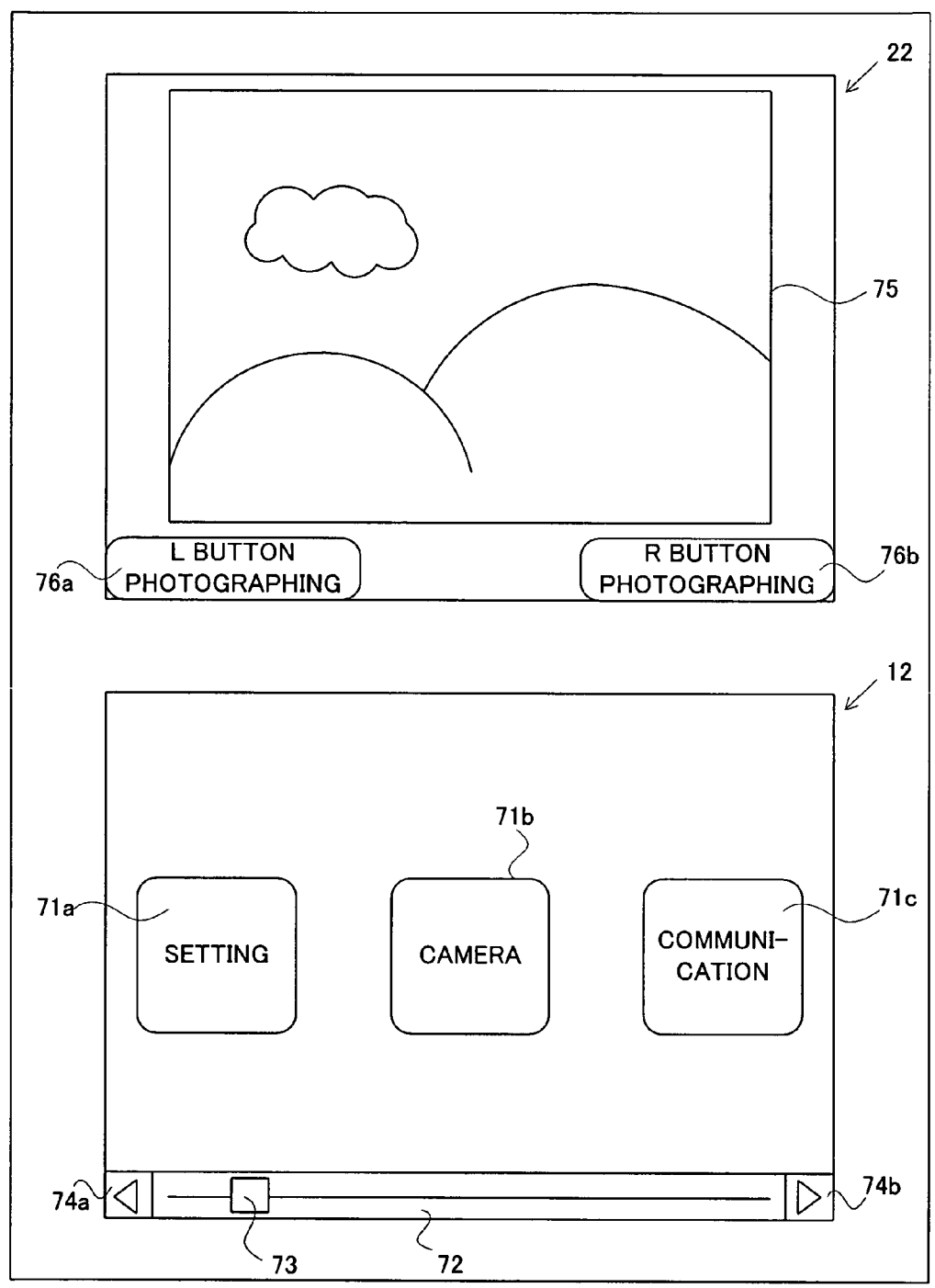
FIG. 7 is a view showing an example of a menu screen in a present embodiment.

FIG. 7 is a view showing an example of the menu screen. As shown in FIG. 7, at the step S5, the image for causing the user to select a selected application program to be executed is displayed on the lower LCD 12. More specifically, icon images 71a to 71c, a scroll bar 72, a marker 73, and scroll buttons 74a and 74b are displayed on the lower LCD 12.

Each of the icon images 71a to 71c is an image indicating a selected application program. In FIG. 7, the three icon images corresponding to three selected application programs, namely, the icon image 71a indicating the setting application program 54, the icon image 71b indicating the multifunctional photographing application program 53, and the icon image 71c indicating the communication application program 55, are displayed. The user can launch a selected application program indicated by the touched icon image by performing an operation of touching the icon image (the icon image 71b in FIG. 7) displayed at a center of the screen (in the left-right direction) as the above first launch operation.

In the present embodiment, three icon images (the icon images 71a to 71c in FIG. 7) among icon images corresponding to a plurality of application programs, respectively, are displayed on the screen. The three icon images being displayed (types of the three icon images being displayed) are changed in accordance with an operation of scrolling the screen. In other words, although icon images indicating selected application programs other than these three selected application programs are not displayed in FIG. 7, the icon images are displayed by scrolling the screen of the lower LCD 12. The scrolling of the screen of the lower LCD 12 can be performed by an operation of touching an icon image other than the icon image displayed at the center of the screen, or by an operation of touching the marker 73 or the scroll button 74a or 74b. In other words, when the user touches the icon image (the icon image 71a or 71c in FIG. 7) other than the icon image displayed at the center of the screen, the screen of the lower LCD 12 is scrolled, and the touched icon image is displayed at the center of the screen. Or, the user can move the marker 73 along the scroll bar 72 by performing an operation of moving a touched position along the scroll bar 72 right and left while touching the marker 73, thereby scrolling the screen of the lower LCD 12 in accordance with the movement of the marker 73. Or, the screen of the lower LCD 12 can be scrolled leftward by an operation of touching the scroll button 74a on the left side of the scroll bar 72, and the screen of the lower LCD 12 can be scrolled rightward by an operation of touching the scroll button 74b on the right side of the scroll bar 72. As described above, in the state where the menu screen is displayed, the user can change the icon image displayed at the center of the screen by the operation of scrolling the screen, and also can launch the selected application program indicated by the icon image by the operation of touching the icon image displayed at the center of the screen.

In the present embodiment, the scrolling of the screen of the lower LCD 12 is performed by an operation of touching an icon image other than the icon image displayed at the center of the screen, or by an operation of touching the marker 73 or the scroll button 74a or 74b. However, the scrolling of the screen of the lower LCD 12 may be performed by another operation. For example, the screen of the lower LCD 12 may be scrolled rightward by pressing a right side portion of the direction input button 14A, and the screen of the lower LCD 12 may be scrolled leftward by pressing a left side portion of the direction input button 14A.

In the present embodiment, all of the plurality of selected application programs are not concurrently displayed, but a part of the plurality of selected application programs is displayed in the form of a list and interchanged with the rest so as to be displayed. Here, in an alternative embodiment, all of the plurality of selected application programs may be concurrently displayed. Alternatively, (icon images of) selected application programs to be displayed as a list may be displayed in a line as in the present embodiment or may be displayed in a matrix state of 2×2 or more.

Meanwhile, as shown in FIG. 7, at the step S5, on the upper LCD 22, a display image 75 and photographing button images 76a and 76b are displayed. The display image 75 is a stored image which is stored in the main memory 32, indicated by the display image data 65, and selected at the step S3, and the like. In other words, in the present embodiment, an image taken in the past is displayed on the menu screen. Thus, a user who uses the information-processing apparatus 10 for the first time is caused to be aware that the information-processing apparatus 10 has the photographing function. Further, the menu screen of the information-processing apparatus 10 is different for each user (each information-processing apparatus), and thus the menu screen can have individuality.

Further, the photographing button images 76a and 76b are images indicating an operation for shifting the state of the information-processing apparatus 10 to a state where it is possible to perform photographing by the simplified photographing program 52 (the photographing enabled state shown in FIG. 4), namely, the above photographing enabling operation. Thus, in the present embodiment, by displaying the operation for shifting the state of the information-processing apparatus 10 to the photographing enabled state on the menu screen (a launch acceptance state), it can be clearly displayed to the user that it is possible to perform photographing by the simplified photographing program 52 from the menu screen (without selecting a selected application program). As shown in FIG. 7, in the present embodiment, the photographing enabling operation is an operation of pressing the L button 14I or the R button 14J. Thus, the user can shift the state of the information-processing apparatus 10 to the state where it is possible to perform photographing by the simplified photographing program 52 by once pressing a button (the L button 14I or the R button 14J) in the launch acceptance state. In the present embodiment, the photographing enabling operation is an operation of pressing a predetermined button (the L button 14I or the R button 14J) provided in the information-processing apparatus 10. However, in an alternative embodiment, the photographing enabling operation may be an operation of touching a predetermined button image displayed on the lower LCD 12.

It is noted that in the present embodiment, except for the start-up for the first time (the case of Yes at the step S1), a screen displayed initially after the start-up of the information-processing apparatus 10 is the menu screen. In other words, in the present embodiment, the information-processing apparatus 10 sets an initial state after the start-up of the information-processing apparatus 10 to the launch acceptance state. Thus, the user can launch the simplified photographing program 52 immediately after the start-up.

Referring back to FIG. 6, subsequent to the step S5, the processing at the step S6 is executed. At the step S6, the CPU 31 accepts an input with respect to each input device. In other words, the CPU 31 obtains operation data from the operation section 14, and also obtains input position data from the touch panel 13. The obtained operation data and input position data are stored in the main memory 32. In the launch acceptance state, the processing at the step S6 is executed every a predetermined time period (e.g. every a one-frame time period (1/60 sec.)). Subsequent to the step S6, the processing at the step S7 is executed.

At the step S7, the CPU 31 determines whether or not an operation of scrolling the screen of the lower LCD 12 has been performed. The determination at the step S7 can be made by referring to the input position data stored in the main memory 32 at the step S6. In other words, in the determination processing at the step S7, the CPU 31 determines whether or not an input of touching a region where the marker 73 or the scroll button 74a or 74b is displayed has been performed. When a result of the determination at the step S7 is positive, the processing at the step S8 is executed. On the other hand, when the result of the determination at the step S7 is negative, the processing at the later-described step S9 is executed.

As described above, in the present embodiment, the step S7 of determining existence/nonexistence of a scrolling operation is executed prior to the step S9 of determining existence/nonexistence of a photographing enabling operation (i.e. detection of a scrolling operation is performed preferentially over detection of a photographing enabling operation). Thus, while a scrolling operation is performed, the state of the information-processing apparatus is not shifted to the photographing enabled state even when a photographing enabling operation is performed. For example, even when an operation of pressing the L button 14I or the R button 14J is performed while an operation of scrolling the screen of the lower LCD 12 right or left is performed by touching the scroll button 74a or 74b on the left or right side of the scroll bar 72 or by pressing the direction input button 14A, the state of the information-processing apparatus is not shifted to the photographing enabled state.

At the step S8, the CPU 31 scrolls a display of the icon images (the screen of the lower LCD 12). In other words, when a touch input is performed with respect to the scroll button 74a, the icon images are scrolled rightward. Thus, an icon image which has not been displayed on the screen of the lower LCD 12 can be displayed. Subsequent to the step S8, the processing at the step S5 is executed again.

Meanwhile, at the step S9, the CPU 31 determines whether or not the photographing enabling operation has been performed. The determination at the step S9 can be made by referring to the operation data stored in the main memory 32 at the step S6. In other words, in the determination processing at the step S9, the CPU 31 determines whether or not the L button 14I or the R button 14J has been pressed. When a result of the determination at the step S9 is positive, the processing at the step S10 is executed. On the other hand, when the result of the determination at the step S9 is negative, the processing at the later-described step S11 is executed.

Figure 8:
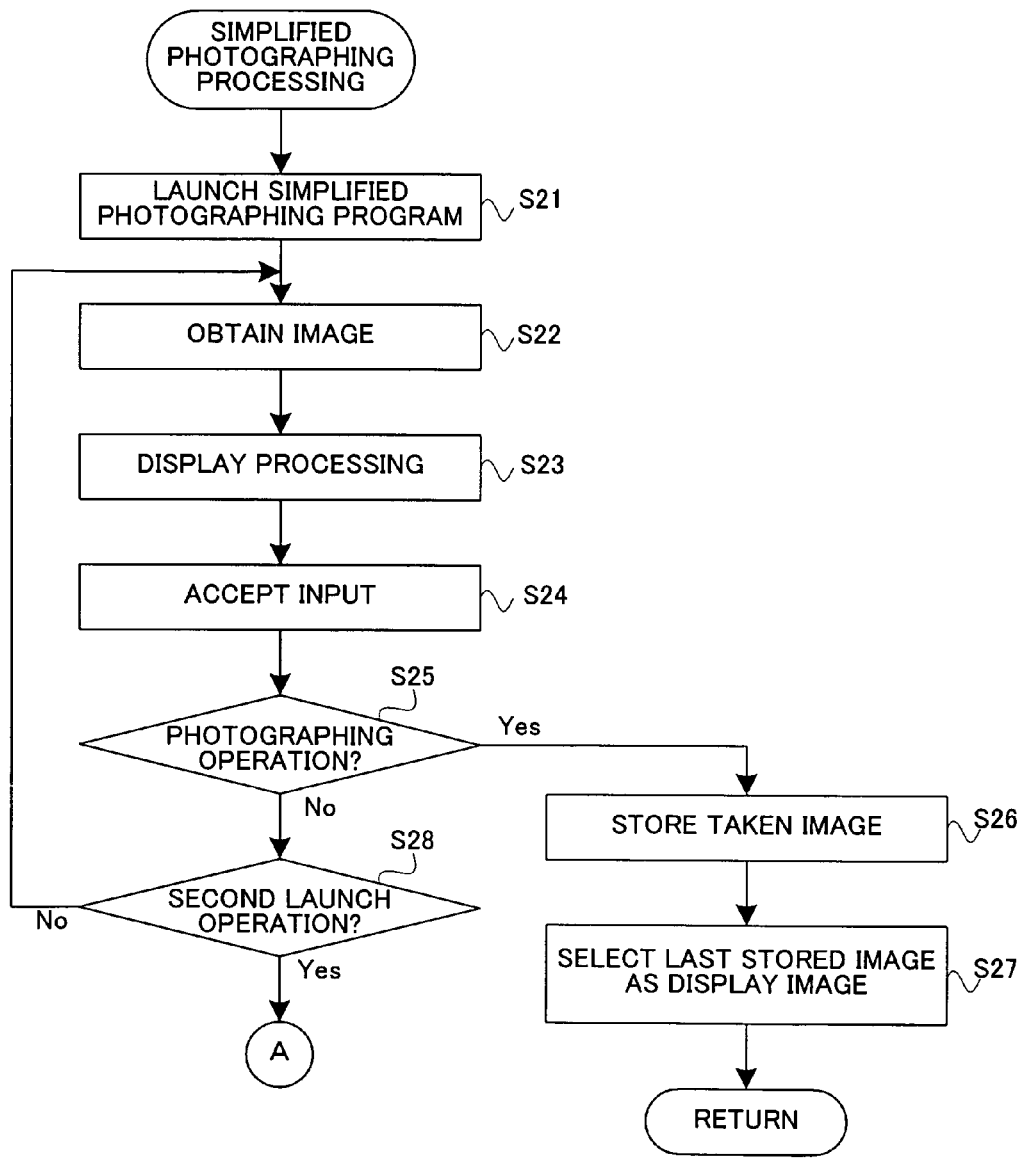
FIG. 8 is a flow chart showing a procedure of simplified photographing processing (a step S10) shown in FIG. 6.

At the step S10, the CPU 31 executes the simplified photographing processing. The simplified photographing processing is processing for causing the user to perform photographing with a simple function by the simplified photographing program 52. With reference to FIG. 8, the following will describe a detail of the simplified photographing processing.

FIG. 8 is a flow chart showing a procedure of the simplified photographing processing (the step S10) shown in FIG. 6. In input image generation processing, first, at a step S21, the CPU 31 launches the simplified photographing program 52. In the present embodiment, since the simplified photographing program 52 has been read into the main memory 32 along with the launch function program 51, the CPU 31 starts executing the simplified photographing program 52. At this time, the data 67 and 68 included in the setting data 66 stored in the main memory 32 are inputted (set) as arguments with respect to the simplified photographing program 52. Processing at steps S22 to S28 after the step S21 is executed using the simplified photographing program 52 (by executing the simplified photographing program 52).

At the step S22, the CPU 31 obtains data of an image taken by the inner camera 23 or the outer camera 24. In the present embodiment, an image is taken by only one of the cameras 23 and 24, and the CPU 31 obtains image data only from the camera. It is noted that which an image is taken by the camera 23 or 24 is determined in accordance with content of the camera change data 67 which is passed as the argument at a time of the launch of the simplified photographing program 52 (the step S21). Subsequent to the step S22, the processing at the step S23 is executed.

At the step S23, the CPU 31 executes display processing. At the step S23 which is in the photographing enabled state, an image taken by the camera 23 or 24, and the like are displayed. The following will describe images displayed in the photographing enabled state using FIG. 9.

FIG. 9 is a view showing an example of the images displayed in the photographing enabled state. As shown in FIG. 9, at the step S23, a taken image 77 by the camera 23 or 24 which is obtained at the step S22 is displayed on the lower LCD 12. The processing at the steps S22 and S23 is repeatedly executed every a predetermined time period (e.g. 1/60 sec.). By repeatedly executing the processing at these steps S22 and S23, a real-time image taken by the camera 23 or 24 is displayed on the lower LCD 12. In an alternative embodiment, the real-time image may be displayed on the upper LCD 22. In this case, an image stored by the photographing operation may be also displayed on the lower LCD 12.

In addition, a button image 78 for performing an operation for executing the multifunctional photographing application program 53 (the above second launch operation) is displayed on the lower LCD 12. Unlike the icon images displayed on the menu screen, the button image 78 is fixedly displayed at a predetermined position (at an upper right position in FIG. 9) on the screen. Although detail will be described later, the user can easily shift the state of the information-processing apparatus 10 from a state of executing the simplified photographing program 52 to a state of executing the multifunctional photographing application program 53 by pressing the button image 78.

Further, similarly as in FIG. 7, the display image 75 and the photographing button images 76*a* and 76*b* are displayed on the upper LCD 22. In the present embodiment, similarly as the photographing enabling operation, the photographing operation is an operation of pressing the L button 14I or the R button 14J (see the photographing button images 76*a* and 76*b* shown in FIG. 9). In an alternative embodiment, the photographing operation may not be the same as the photographing enabling operation, and, for example, a button image for performing the photographing operation may be displayed on the lower LCD 12, and an operation of touching the button image may be the photographing operation. Further, the information-processing apparatus 10 may accept both the operation of pressing the L button 14I or the R button 14J and the operation of touching the button image as the photographing operation.

Referring back to FIG. 8, subsequent to the step S23, the processing at the step S24 is executed. At the step S24, the CPU 31 accepts an input with respect to each input device. The processing at the step S24 is the same as the processing at the above step S6. Subsequent to the step S24, the processing at the step S25 is executed.

At the step S25, the CPU 31 determines whether or not the photographing operation has been performed. The determination at the step S25 can be made by referring to operation data stored in the main memory 32 at the step S24. In the present embodiment, since the first launch operation and the photographing operation are the same as each other, the processing at the step S25 can be executed similarly as the processing at the step S9. When a result of the determination at the step S25 is positive, the processing at the step S26 is executed. On the other hand, when the result of the determination at the step S25 is negative, the processing at the later-described step S27 is executed.

At the step S26, the CPU 31 stores a taken image. In other words, the CPU 31 stores the taken image obtained at the step S22 in the stored data memory 34 or the memory card 28. A storage destination of the taken image is determined in accordance with content of the storage destination data 68 which is passed as the argument at the time of the launch of the simplified photographing program 52 (the step S21). It is noted that the storage destination of the taken image can be changed by the user in the multifunctional photographing processing by the later-described multifunctional photographing application program 53. Subsequent to the step S26, the processing at the step S27 is executed.

At the step S27, the CPU 31 selects the stored image which is stored at the last step S26 as a display image. More specifically, the CPU 31 stores data indicative of the stored image which is stored at the last step S26 as the display image data 65 in the main memory 32. After the processing at the step S27, the CPU 31 terminates the execution of the simplified photographing program 52, and terminates the simplified photographing processing. Then, the processing at the step S4 shown in FIG. 6 is executed again.

As described above, in the present embodiment, in accordance with the photographing operation being performed in the photographing enabled state (the simplified photographing processing), the simplified photographing processing is terminated, and the state of the information-processing apparatus 10 is shifted from the photographing enabled state to the launch acceptance state. In other words, when the user once performs the photographing operation in the simplified photographing processing, a screen display of the information-processing apparatus 10 is returned to the menu screen, and thus even a novice user who has not read an instruction manual, and the like can naturally return to the launch acceptance state. Further, in the present embodiment, since the photographing enabling operation and the photographing operation are the same as each other, a shift from the launch acceptance state to the photographing enabled state and a shift from the photographing enabled state to the launch acceptance state can be performed by the same operation. Thus, even if the user accidentally presses the L button 14I or the R button 14J or presses the L button 14I or the R button 14J without fully understanding a manner of operation to shift the state of the information-processing apparatus 10 to the photographing enabled state, the user can return to the original state (the launch acceptance state) by pressing the same button. Thus, the information-processing apparatus 10 which is easy for the novice user to operate can be provided. In an alternative embodiment, the photographing enabling operation and the photographing operation may be different from each other. Even in this case, an operation for shifting the state of the information-processing apparatus 10 from the photographing enabled state to the launch acceptance state and the photographing enabling operation may be the same as each other. For example, the photographing enabling operation may be an operation of pressing the L button 14I or the R button 14J, the photographing operation may be an operation of touching a predetermined button image displayed on the lower LCD 12, and the operation for shifting the state of the information-processing apparatus 10 from the photographing enabled state to the launch acceptance state may be an operation of pressing the L button 14I or the R button 14J.

Further, in the present embodiment, as described above, the state of the information-processing apparatus 10 is shifted to the launch acceptance state after the photographing operation is performed. Thus, the state of the information-processing apparatus 10 is shifted to the launch acceptance state without displaying the image stored in the processing at the above step S26 by the simplified photographing program 52. Here, in the present embodiment, in the processing at the step S27, the CPU 31 sets the image stored in the processing at the step S26 as a display image after the shift to the launch acceptance state. Thus, the stored image taken by the simplified photographing program 52 is displayed as the display image immediately after the shift to the launch acceptance state. As a result, according to the present embodiment, although the state of the information-processing apparatus 10 is shifted to the launch acceptance state by performing the photographing operation, the user can quickly confirm the image taken by the simplified photographing program 52.

Meanwhile, at the step S28, the CPU 31 determines whether or not the second launch operation has been performed. The determination at the step S28 can be made by referring to input position data stored in the main memory 32 at the step S24. In other words, in the determination processing at the step S28, the CPU 31 determines whether or not an input of touching a region where the button image 78 for performing the second launch operation is displayed has been perfumed. When a result of the determination at the step S28 is positive, the later-described multifunctional photographing processing (FIG. 10) is executed. On the other hand, when the result of the determination at the step S28 is negative, the processing at the step S22 is executed again. This is the end of the description of the simplified photographing processing shown in FIG. 8.

Referring back to FIG. 6, at the step S11, the CPU 31 determines whether or not the first launch operation has been performed. The determination at the step S11 can be made by referring to the input position data stored in the main memory 32 at the step S6. In other words, in the determination processing at the step S11, the CPU 31 determines whether or not an input of touching a region where the icon image is displayed has been performed. When a result of the determination at the step S11 is positive, the processing at the step S12 is executed. On the other hand, when the result of the processing at the step S11 is negative, the processing at the later-described step S13 is executed.

At the step S12, the CPU 31 executes processing of executing a selected application program. In other words, the CPU 31 reads a selected application program corresponding to the icon image selected by the first launch operation into the main memory 32, and executes the selected application program. Thus, the selected application program is started, and the user can use the selected application program. The processing at the step S12 is terminated by terminating the selected application program, and the processing at the step S3 is executed again subsequent to the step S12.

Figure 10:
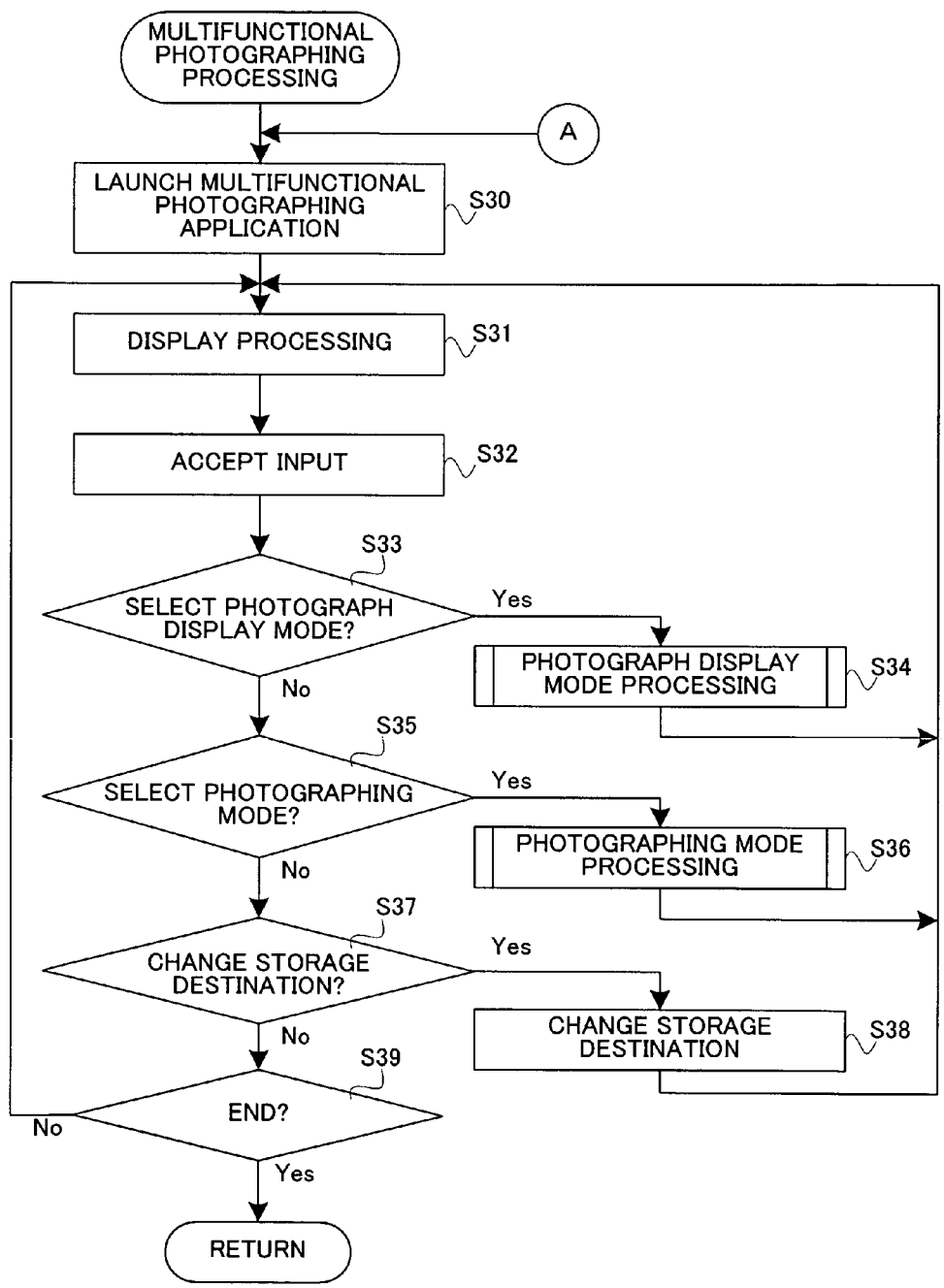
FIG. 10 is a flow chart showing a procedure of multifunctional photographing processing in the present embodiment.

Here, a case where the multifunctional photographing application program 53 is executed as the selected application program at the above step S12 will be described in detail. FIG. 10 is a flow chart showing a procedure of processing by the multifunctional photographing application program 53 (the multifunctional photographing processing). In the multifunctional photographing processing, first, at a step S30, the CPU 31 launches the multifunctional photographing application program 53. In other words, the CPU 31 reads the multifunctional photographing application program 53 into the main memory 32, and starts executing the multifunctional photographing application program 53. At this time, the data 67 and 68 included in the setting data 66 stored in the main memory 32 are inputted (set) as arguments with respect to the simplified photographing program 52. Subsequent to the step S30, processing at a step S31 is executed. The processing at the steps S31 to S39 after the step S30 is executed using the multifunctional photographing application program 53 (by executing the multifunctional photographing application program 53).

At the step S31, the CPU 31 executes display processing. Here, in the present embodiment, in the multifunctional photographing processing, there are a photographing mode for performing photographing using the imaging means and a photograph display mode for displaying an image (a stored image) taken in the past. In the display processing at the step S31, an image for causing the user to select either one of the two modes (the photograph display mode and the photographing mode) in the multifunctional photographing processing, and an image for setting a storage destination of a taken image to be stored by the photographing operation are displayed on at least one of the LCDs 12 and 22. Although not shown in the drawings, in the present embodiment, an image indicating each of the photograph display mode and the photographing mode, and an image indicating an instruction to change a storage destination of a taken image are displayed on the lower LCD 12. It is noted that a method for causing the user to select a mode and a method for causing the user to change a storage destination may be any methods, and the user may be caused to perform selection and changing with a button instead of the touch panel 13.

At the step S32, the CPU 31 accepts an input with respect to each input device. The processing at the step S32 is the same as the processing at the above step S6. Subsequent to the step S32, the processing at the step S33 is executed.

At the step S33, the CPU 31 determines whether or not the photograph display mode has been selected. The determination at the step S33 can be made by referring to input position data stored in the main memory 32 at the step S32. In other words, in the determination processing at the step S33, the CPU 31 determines whether or not an input of touching a region where the image indicating the photograph display mode is displayed has been performed. When a result of the determination at the step S33 is positive, the processing at step S34 is executed. On the other hand, when the result of the determination at the step S33 is negative, the processing at the later-described step S35 is executed.

Figure 11:
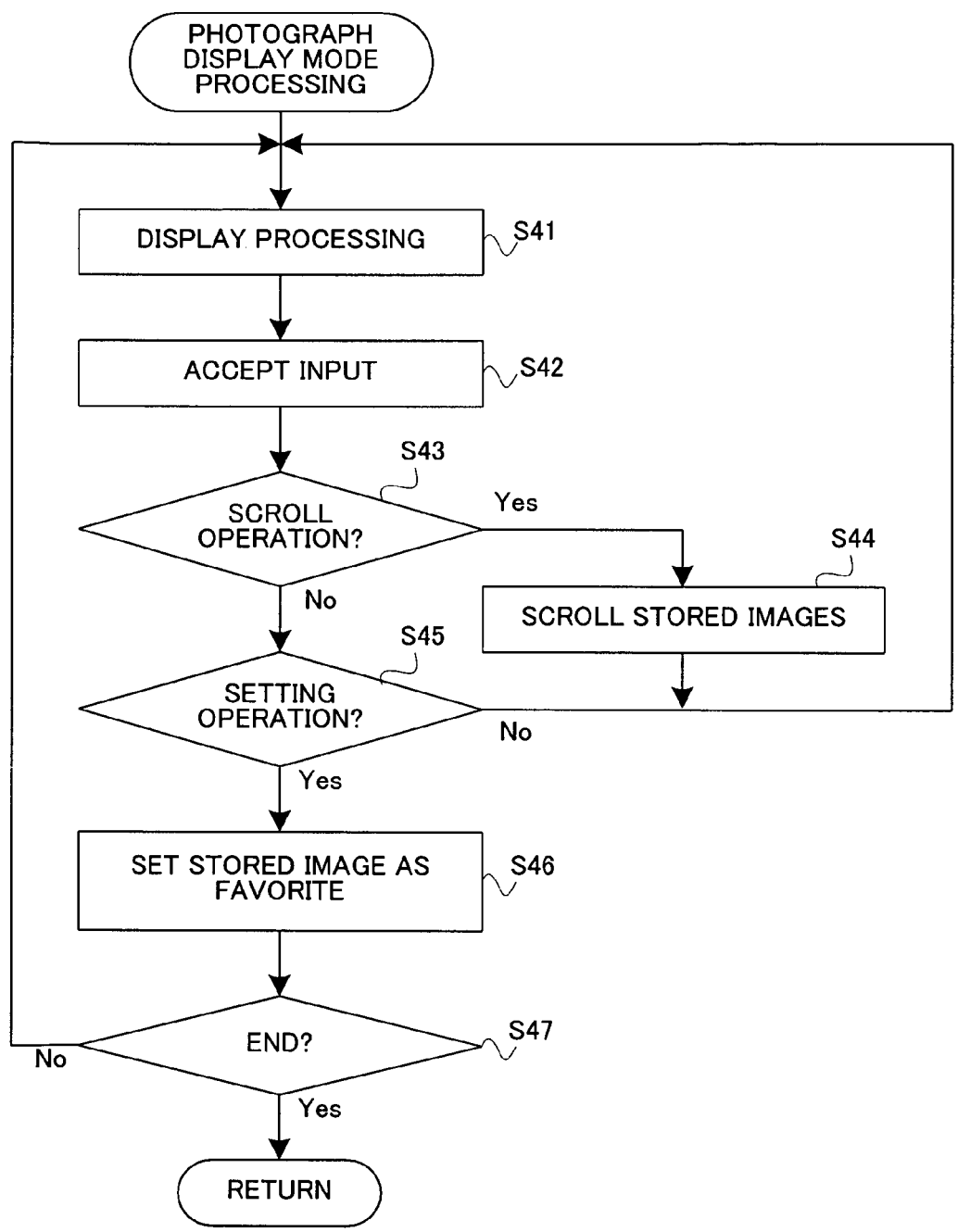
FIG. 11 is a flow chart showing a procedure of photograph display mode processing (a step S34) shown in FIG. 10.

At the step S34, the CPU 31 executes processing to be executed in the photograph display mode (photograph display mode processing). With reference to FIG. 11, the following will describe a detail of the photograph display mode processing.

Figure 12:
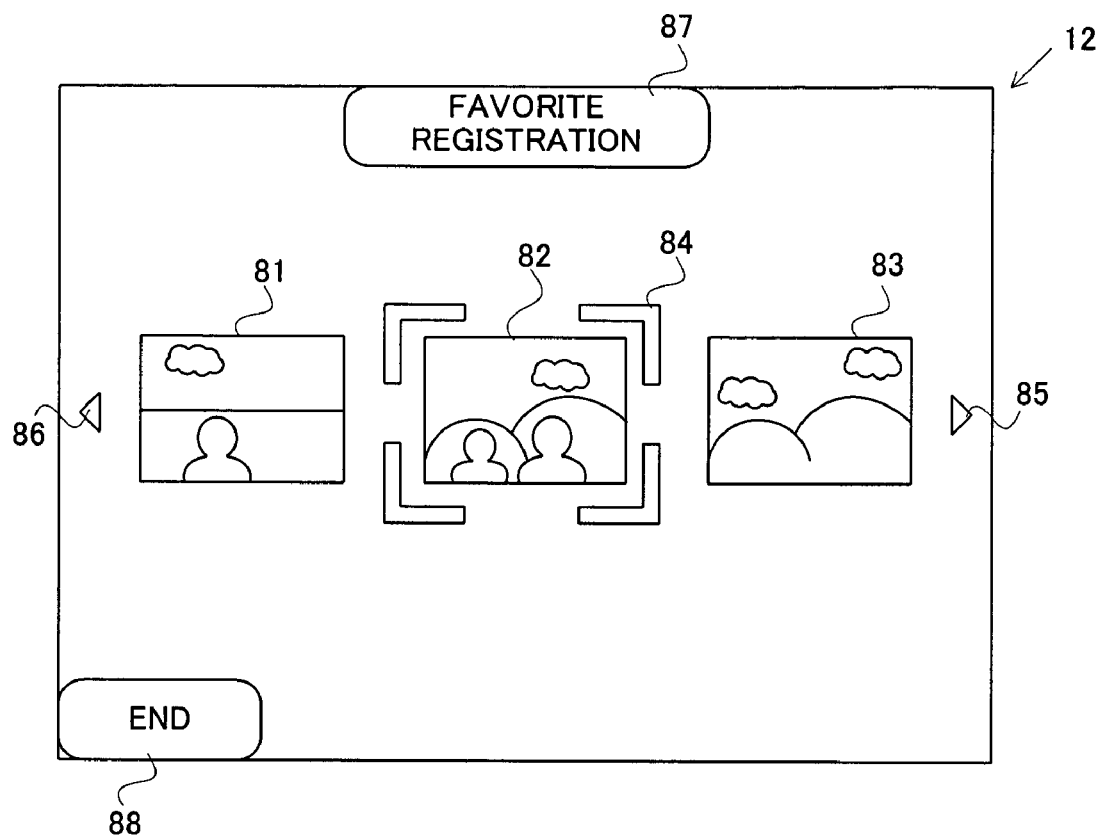
FIG. 12 is a view showing an example of images displayed in a photograph display mode in the present embodiment.

FIG. 11 is a flow chart showing a procedure of the photograph display mode processing (the step S34) shown in FIG. 10. In the photograph display mode processing, first, at a step S41, the CPU 31 executes display processing. At the step S41 in the photograph display mode, a stored image taken in the past, and the like are displayed. With reference to FIG. 12, the following will describe images displayed in the photograph display mode.

FIG. 12 is a view showing an example of the images displayed in the photograph display mode. As shown in FIG. 12, at the step S41, a plurality of stored images 81 to 83 (three in the drawing), cursors 84, scroll buttons 85 and 86, a setting button 87, and an end button 88 are displayed on the lower LCD 12.

In FIG. 12, the stored images 81 to 83 are (a part of) stored images which are stored in the stored data memory 34 or the memory card 28. The stored image 82 surrounded by the cursors 84 is an image which is currently selected by the cursors 84. The scroll buttons 85 and 86 are buttons for scrolling the stored images 81 to 83 right and left. In other words, when a touch input is performed with respect to the scroll button 85 on the right side of the screen, the stored images 81 to 83 are scrolled rightward, and when a touch input is performed with respect to the scroll button 86 on the left side of the screen, the stored images 81 to 83 are scrolled leftward. When the stored images are scrolled rightward or leftward, the stored images being displayed on the lower LCD 12 are changed, and the stored image selected by the cursors 84 is also changed.

It is noted that in the present embodiment, in the photograph display mode, a taken image which is stored in either the simplified photographing processing or the multifunctional photographing processing is displayed. In the present embodiment, a stored image which is stored in the simplified photographing processing, and a stored image which is stored in the multifunctional photographing processing are stored without distinguishing therebetween. More specifically, for either stored image, a rule for attaching a file name to a data file of the stored image (e.g. attaching a file name using time and date to be photographed, a total number of images taken by the information-processing apparatus 10, and the like) is the same. Since the stored images which are stored in either photographing processing are stored without distinguishing therebetween, the stored image which is stored in each photographing processing can be displayed in the photograph display mode.

The setting button 87 is a button image for performing an operation for newly setting the stored image selected by the cursors 84 as a favorite image. In other words, when a touch input is performed with respect to the setting button 87, the stored image selected by the cursors 84 is set as a favorite image.

The end button 88 is a button image for performing an operation for terminating the photograph display mode. In other words, when a touch input is performed with respect to the end button 88, the photograph display mode is terminated, and the processing by the CPU 31 is returned to the processing at the step S31.

It is noted that at the step S41, some information may be displayed on the upper LCD 22 or may not be displayed on the upper LCD 22. In the present embodiment, the CPU 31 displays the stored image selected by the cursors 84 on the upper LCD 22.

Referring back to FIG. 11, subsequent to the step S41, processing at a step S42 is executed. At the step S42, the CPU 31 accepts an input with respect to each input device. The processing at the step S42 is the same as the processing at the step S6. Subsequent to the step S42, processing at a step S43 is executed.

At the step S43, the CPU 31 determines whether or not an operation of scrolling the stored images being displayed on the lower LCD 12 has been performed. The determination at the step S43 can be made by referring to input position data stored in the main memory 32 at the step S42. In other words, in the determination processing at the step S43, the CPU 31 determines whether or not an input of touching a region where the scroll button 85 or 86 is displayed has been performed. When a result of the determination at the step S43 is positive, processing at a step S44 is executed. On the other hand, when the result of the determination at the step S43 is negative, processing at a later-described step S45 is executed.

At the step S44, the CPU 31 scrolls the stored images being displayed on the lower LCD 12. In other words, when a touch input is performed with respect to the scroll button 85, the CPU 31 scrolls the stored images rightward, and when a touch input is performed with respect to the scroll button 86, the CPU 31 scrolls the stored images leftward. Thus, a stored image which has not been displayed on the screen of the lower LCD 12 is displayed. Subsequent to the step S44, the processing at the above step S41 is executed again.

Meanwhile, at the step S45, the CPU 31 determines whether or not an operation for setting a stored image as a favorite image has been performed. The determination at the step S45 can be made by referring to the input position data stored in the main memory 32 at the step S42. In other words, in the determination processing at the step S45, the CPU 31 determines whether or not an input of touching a region where the setting button 87 is displayed has been performed. When a result of the determination at the step S45 is positive, processing at a step S46 is executed. On the other hand, when the result of the determination at the step S45 is negative, the processing at the above step S41 is executed again.

At the step S46, the CPU 31 sets a stored image which is currently selected by the cursors 84 as a favorite image. More specifically, the CPU 31 adds information indicative of the favorite image to data of the stored image which is stored in the stored data memory 34 or the memory card 28. In addition, in the present embodiment, at the step S46, the CPU 31 causes the user to select which the stored image is to be set to the first, second, or third group. Thus, information indicative of a group selected by the user among the first to third groups is added to the data of the stored image. Subsequent to the step S46 described above, processing at a step S47 is executed.

At the step S47, the CPU 31 determines whether or not to terminate the photograph display mode. The determination at the step S47 can be made by referring to the input position data stored in the main memory 32 at the step S42. In other words, in the determination processing at the step S47, the CPU 31 determines whether or not an input of touching a region where the end button 88 is displayed has been performed. When a result of the determination at the step S47 is positive, the CPU 31 terminates the photograph display mode processing shown in FIG. 11. On the other hand, when the result of the determination at the step S47 is negative, the processing at the above step S41 is executed again.

In the photograph display mode described above, the user can view the stored images taken in the past, and also can set the stored image as a favorite image. As described above, at the above step S3, the display image displayed on the menu screen (the display image 75 shown in FIG. 7) is selected among the favorite images. Thus, the user can select an image to be displayed as a display image by himself or herself.

Referring back to FIG. 10, when the processing at the above step S34 is terminated, the processing at the step S31 is executed again. Thus, when the photograph display mode is terminated, the screen for causing the user to select either the photograph display mode or the photographing mode is displayed again (the step S31).

Meanwhile, at the step S35, the CPU 31 determines whether or not the photographing mode has been selected. The determination at the step S35 can be made by referring to the input position data stored in the main memory 32 at the step S32. In other words, in the determination processing at the step S35, the CPU 31 determines whether or not an input of touching a region where the image indicating the photographing mode is displayed has been performed. When a result of the determination at the step S35 is positive, the processing at the step S36 is executed. On the other hand, when the result of the determination at the step S35 is negative, the processing at the later-described step S37 is executed.

Figure 13:
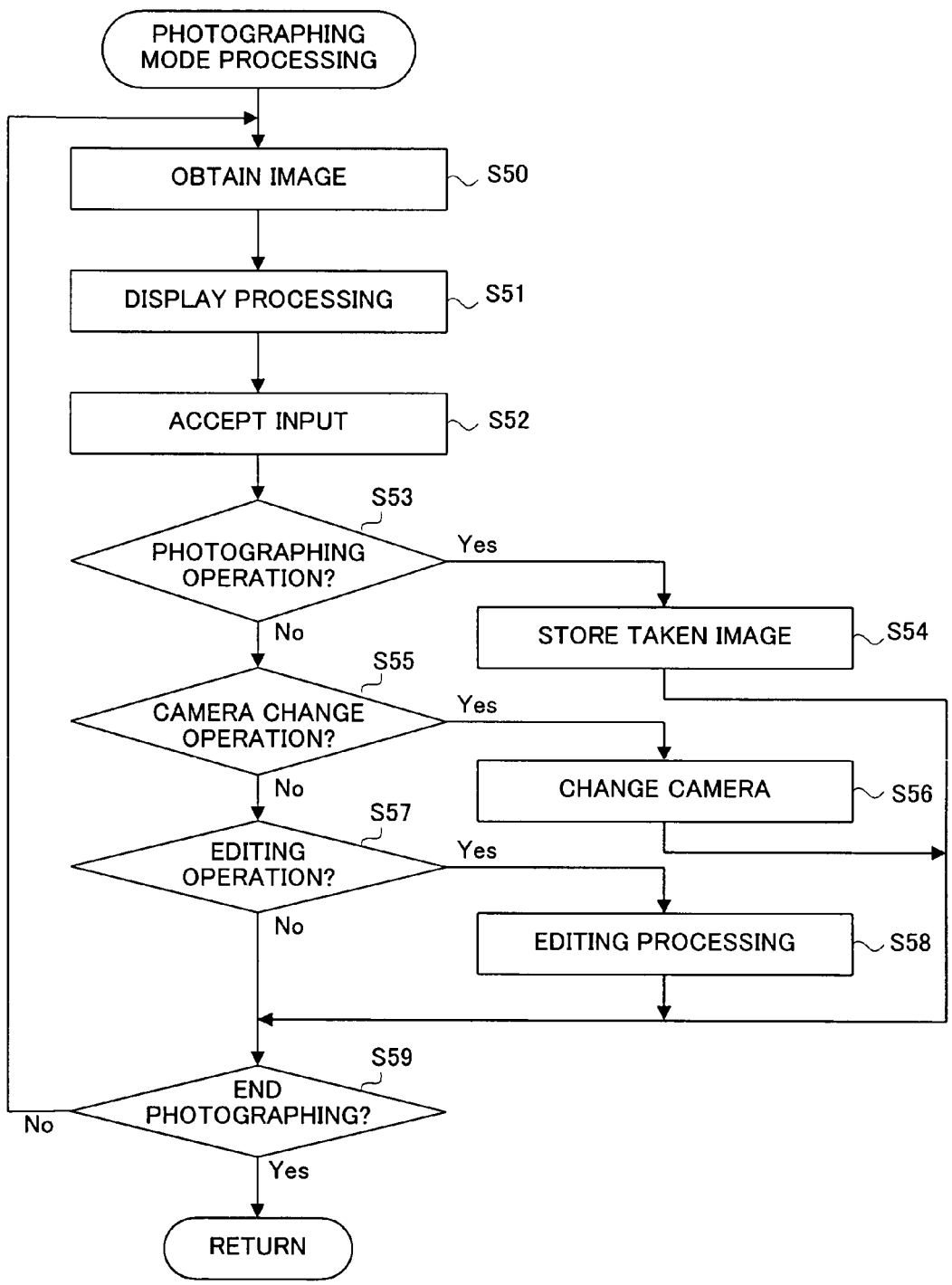
FIG. 13 is a flow chart showing a procedure of photographing mode processing (a step S36) shown in FIG. 11.

At the step S36, the CPU 31 executes processing to be executed in the photographing mode (photographing mode processing) With reference to FIG. 13, the following will describe a detail of the photographing mode processing.

FIG. 13 is a flow chart showing a procedure of the photographing mode processing (the step S36) shown in FIG. 11. In the photographing mode processing, first, at a step S50, the CPU 31 obtains data of an image taken by the inner camera 23 or the outer camera 24. The processing at the step S50 is the same as the processing at the above step S22 (FIG. 8). Subsequent to the step S50, processing at a step S51 is executed.

At the step S51, the CPU 31 executes display processing. At the step S51 which is in the photographing mode, the taken image by the camera 23 or 24, and the like are displayed. The following will describe an image displayed in the photographing mode using FIG. 14.

Figure 14:
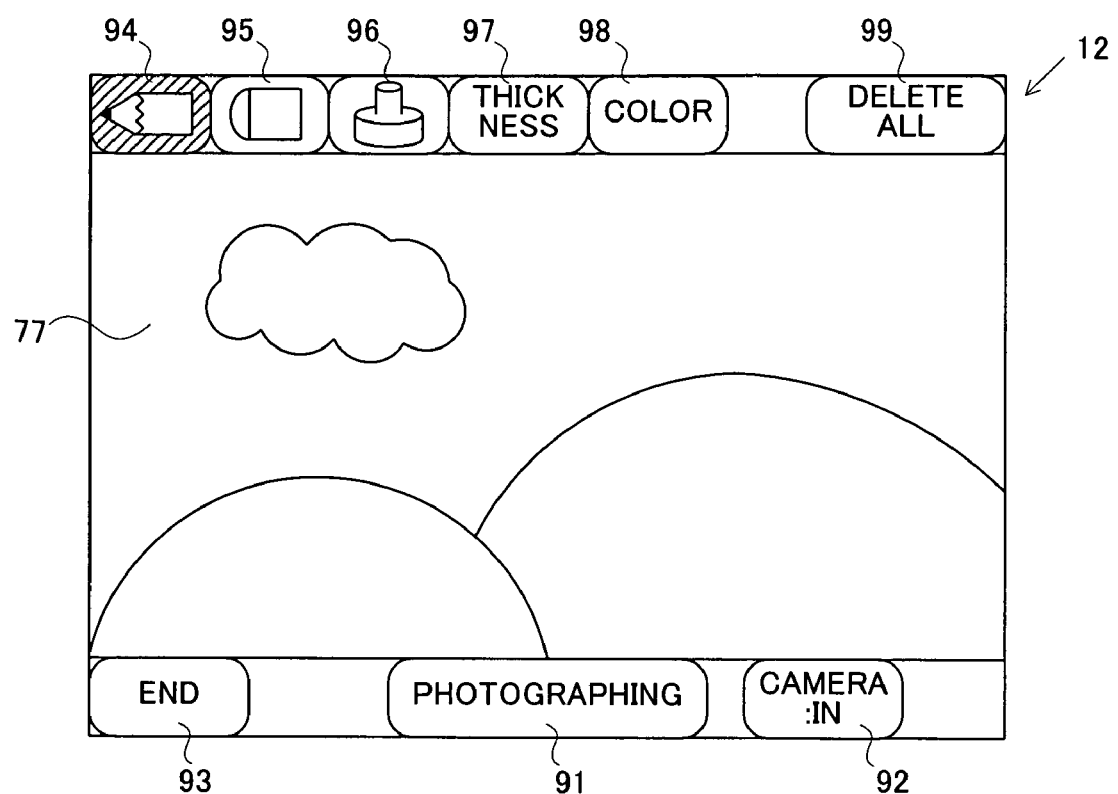
FIG. 14 is a view showing an example of an image displayed in a photographing mode in the present embodiment.

FIG. 14 is a view showing an example of the image displayed in the photographing mode. As shown in FIG. 14, at the step S51, in addition to the taken image 77 similarly as in FIG. 9, various buttons 91 to 99 are displayed on the lower LCD 12. Each of the buttons 91 to 99 is an image for performing an instruction with respect to the information-processing apparatus 10 by the user performing a touch input with respect to a position of the image. The following will describe the buttons 91 to 99.

The photographing button 91 is a button image for performing the photographing operation. In other words, when a touch input is performed with respect to the photographing button 91, processing of storing a taken image is executed. It is noted that the photographing button 91 is preferably displayed substantially at a center of the lower housing 11 (in the left-right direction) for the user to easily operate the photographing button 91 with either a right hand or a left hand.

The camera change button 92 is an image for performing a camera change operation. In other words, when a touch input is performed with respect to the camera change button 92, a camera for taking an image is changed between the inner camera 23 and the outer camera 24.

The end button 93 is a button image for performing an operation for terminating the photographing mode. In other words, when a touch input is performed with respect to the end button 93, the photographing mode is terminated, and the processing by the CPU 31 is returned to the processing at the step S31.

Each of the buttons 94 to 99 is a button image for performing an instruction in editing processing. The pen mode button 94, the eraser mode button 95, and the stamp mode button 96 are button images for performing an operation for changing an editing mode. Here, in the present embodiment, three modes, namely, a pen mode, a stamp mode, and an eraser mode, are prepared in advance. In the pen mode, an image of an input line which is inputted with respect to the touch panel 13 can be added to a taken image. In the stamp mode, a stamp image which is prepared in advance can be added to a taken image. In the eraser mode, an image added in the pen mode or the stamp mode can be deleted. The pen mode button 94 is an image for performing an instruction to change the editing mode to the pen mode. The eraser mode button 95 is an image for performing an instruction to change the editing mode to the eraser mode. The stamp mode button 96 is an image for performing an instruction to change the editing mode to the stamp mode.

The thickness change button 97 is an image for performing an instruction to change a thickness of a line to be inputted in the pen mode. The color change button 98 is an image for performing an instruction to change a color of a line to be inputted in the pen mode. An all deletion button 99 is an image for performing an instruction to delete all images added in the pen mode or the stamp mode.

By performing an instruction using each of the above buttons 94 to 99, the user can input an image on the taken image displayed on the lower LCD 12 (so as to be superimposed on the taken image). It is noted that FIG. 14 shows an image in the case where there is no image inputted by the user in the later-described editing processing. Further, in the present embodiment, an image for explaining a manner of operation in the photographing mode to the user is displayed on the upper LCD 12.

Referring back to FIG. 13, at a step S52, the CPU 31 accepts an input with respect to each input device. The processing at the step S52 is the same as the processing at the above step S6. Subsequent to the step S52, processing at a step S33 is executed.

At the step S53, the CPU 31 determines whether or not the photographing operation has been performed. The determination at the step S53 can be made by referring to operation data and input position data which are stored in the main memory 32 at the step S52. In other words, in the determination processing at the step S53, the CPU 31 determines whether or not the L button 14I or the R button 14J has been pressed, or whether or not an input of touching a region where the photographing button 91 is displayed has been performed. Thus, in the multifunctional photographing processing, the user can perform an operation which is the same as the photographing operation in the simplified photographing processing (the operation of pressing the L button 14I or the R button 14J) as the photographing operation, and also can perform an operation of touching the photographing button 91 as the photographing operation. When a result of the determination at the step S53 is positive, processing at a step S54 is executed. On the other hand, when the result of the determination at the step S53 is negative, processing at a later-described step S55 is executed.

As described at the above step S53, in the present embodiment, the photographing processing function which is owned in common by the simplified photographing program 52 and the multifunctional photographing application program 53 is executed in accordance with the same operation (the operation of pressing the L button 14I or the R button 14J). Since it is possible to perform the same operation regarding the same function even when a program is changed, a user-friendly operation system can be provided. It is noted that the phrase "the function owned in common is executed in accordance with the same operation" means that the same function may be executed by an operation in either the simplified photographing program 52 or the multifunctional photographing application program 53, and does not mean to exclude a meaning that in either the simplified photographing program 52 or the multifunctional photographing application program 53, the function is executed by an operation different from the operation. In other words, as in the present embodiment, in the multifunctional photographing application program 53, the photographing processing may be executed by the operation of touching the photographing button 91 in addition to the operation of pressing the L button 14I or the R button 14J.

At a step S54, the CPU 31 stores a taken image. The processing at the step S54 is the same as the processing at the step S26 in the above simplified photographing processing. Thus, in the present embodiment, processing of storing a taken image is similarly executed in the simplified photographing processing and the multifunctional photographing processing. More specifically, a method of deciding a camera used for taking an image and a method of deciding a storage destination in the simplified photographing processing are the same as those in the multifunctional photographing processing. Subsequent to the step S54, processing at a later-described step S59 is executed.

At the step S55, the CPU 31 determines whether or not the camera change operation has been performed. The determination at the step S55 can be made by referring to the input position data stored in the main memory 32 at the step S52. In other words, in the determination processing at the step S55, the CPU 31 determines whether or not an operation of touching a region where the camera change button 92 is displayed has been performed. When a result of the determination at the step S55 is positive, processing at a step S56 is executed. On the other hand, when the result of the determination at the step S55 is negative, processing at a later-described step S57 is executed.

At the step S56, the CPU 31 changes the camera for taking an image. In other words, when the camera for taking an image is the inner camera 23, the CPU 31 changes the camera for taking an image to the outer camera 24. When the camera for taking an image is the outer camera 24, the CPU 31 changes the camera for taking an image to the inner camera 23. More specifically, the CPU 31 gives an instruction to stop an operation to one of the cameras 23 and 24 taking an image, and gives an instruction to perform imaging to the other camera. When the processing at the above step S56 is executed, at the step S50 executed the next time, data of an image taken by the camera after the change is obtained by the CPU 31, and at the step S51 executed the next time, the image taken by the camera after the change is displayed on the lower LCD 12. Further, at the step S56, the CPU 31 stores data of indicative of the camera after the change as the camera change data 67 in the main memory 32. Thus, when the multifunctional photographing processing is executed the next time, or when the simplified photographing processing is executed the next time, imaging is performed by the camera after the change. Subsequent to the step S56, the processing at the later-described step S59 is executed.

At the step S57, the CPU 31 determines whether or not an editing operation has been performed. The determination at the step S57 can be made by referring to the input position data stored in the main memory 32 at the step S52. In other words, in the determination processing at the step S57, the CPU 31 determines whether or not an input of touching a region where any of the buttons 94 to 99 is displayed or a region where the taken image 77 is displayed has been performed. When a result of the determination at the step S57 is positive, processing at a step S58 is executed. On the other hand, when the result of the determination at the step S57 is negative, the processing at the later-described step S59 is executed.

At the step S58, the CPU 31 executes various editing processing in accordance with a touch input performed by the user. For example, when any of the buttons 94 to 98 is touched, the CPU 31 changes settings (the editing mode, settings regarding the thickness or the color of a line) in accordance with a touched button. When the region of the taken image 77 is touched, the CPU 31 executes processing according to the editing mode with respect to a touched position. In other words, when the editing mode is the pen mode, an image of a line by a touch input is added to the taken image 77, when the editing mode is the stamp mode, a stamp image which is prepared in advance is added to the taken image 77 at the touch position, and when the editing mode is the eraser mode, the image added at the touched position in the pen mode or the stamp mode is deleted. When the all deletion button 99 is touched, all images added to the taken image 77 in the pen mode or the stamp mode are deleted. Subsequent to the step S58 described above, the processing at the step S59 is executed.

At the step S59, the CPU 31 determines whether or not to terminate the photographing mode. The determination at the step S59 can be made by referring to the input position data stored in the main memory 32 at the step S452. In other words, in the determination processing at the step S59, the CPU 31 determines whether or not an input of touching a region where the end button 93 is displayed has been performed. When a result of the step S59 is positive, the CPU 31 terminates the photographing mode processing shown in FIG. 13. On the other hand, when the result of the determination at the step S59 is negative, the processing at the above step S50 is executed again. This is the end of the description of the photographing mode processing shown in FIG. 13.

Referring back to FIG. 10, when the processing at the above step S36 is terminated, the processing at the step S31 is executed again. Thus, when the photographing mode is terminated, the screen for causing the user to select either the photograph display mode or the photographing mode is displayed again (the step S31).

Meanwhile, at the step S37, the CPU 31 determines whether or not an operation for changing a storage destination of a stored image has been performed. The determination at the step S37 can be made by referring to the input position data stored in the main memory 32 at the step S32. In other words, in the determination processing at the step S37, the CPU 31 determines whether or not an input of touching a region where the image indicating the instruction to change a storage destination of a taken image has been performed. When a result of the determination at the step S37 is positive, the processing at the step S38 is executed. On the other hand, when the result of the determination at the step S37 is negative, the processing at the later-described step S39 is executed.

At the step S38, the CPU 31 changes a storage destination of a taken image. In other words, when a current storage destination is the stored data memory 34, the storage destination is changed to the memory card 28, and when the current storage destination is the memory card 28, the storage destination is changed to the stored data memory 34. More specifically, the CPU 31 stores data indicative of the storage destination after the change as the storage destination data 68 in the main memory 32. Subsequent to the step S38, the processing at the step S31 is executed again.

At the step S39, the CPU 31 determines whether or not to terminate the multifunctional photographing processing. The determination is made by determining whether or not an instruction to terminate the multifunctional photographing processing has been performed by the user. For example, a button image for performing an operation for terminating the multifunctional photographing processing may be displayed in the display processing at the step S31, the instruction to terminate the multifunctional photographing processing may be performed by touching the button image. Alternatively, the instruction may be performed by pressing a predetermined button. When a result of the determination at the step S39 is negative, the processing at the step S31 is executed again. On the other hand, when the result of the determination at the step S39 is positive, the CPU 31 terminates the execution of the multifunctional photographing application program 53, and terminates the multifunctional photographing processing. Then, the processing at the step S3 shown in FIG. 6 is executed again.

Referring back to FIG. 6, at the step S13, the CPU 31 determines whether or not to terminate the processing in the information-processing apparatus 10. The determination at the step S13 is made by determining whether or not a predetermined termination instruction operation (more specifically, an operation of pressing the power button 14F, and the like) has been performed by the user. When a result of the determination at the step S13 is negative, the processing at the step S5 is executed again. On the other hand, when the result of the determination at the step S13 is positive, the CPU 31 terminates the processing shown in FIG. 6.

As described above, according to the present embodiment, in the state where the menu screen is displayed (in the launch acceptance state; at the step S5), the information-processing apparatus 10 accepts the first launch operation for launching a selected application program (the steps S11 and S12), and also the photographing enabling operation for launching the simplified photographing program 52 (the steps S9 and S10). Thus, since the simplified photographing program 52 is quickly launched by the photographing enabling operation from the state where the menu screen is displayed, the user can easily launch the simplified photographing program 52. Particularly, in the present embodiment, in order to launch a desired selected application program, the user has to perform the first launch operation after performing a scrolling operation according to need, while the user only has to perform the photographing enabling operation in order to launch the simplified photographing program 52. Thus, in the present embodiment, it is possible to launch the simplified photographing program 52 more easily than the selected application program.

In addition, according to the above embodiment, during the execution of the simplified photographing program 52 (in the photographing enabled state; at the steps S22 to S28), the CPU 31 accepts the second launch operation for launching the photographing application program 53 (the step S28). According to this, the user can launch the multifunctional photographing application program 53 by the second launch operation even while performing photographing by the simplified photographing program 52. Therefore, even when the user desires to use a function of the multifunctional photographing application program 53 which the simplified photographing program 52 does not have while performing photographing by the simplified photographing program 52, the user can easily and quickly use the function by the second launch operation.

Further, in the present embodiment, it is possible to quickly launch the simplified photographing program 52 having a relatively simple function from the menu screen, and it is possible to launch the multifunctional photographing application program 53 having more functions during the execution of the simplified photographing program 52. Thus, according to the present embodiment, the user can be caused to use the information-processing apparatus 10 in a usage manner in which "the information-processing apparatus 10 is initially operated by a photographing program having a simple function, and then various photographing functions of the information-processing apparatus 10 are used by a photographing program having more functions", and the user can be caused to use the information-processing apparatus 10 so as to get used to an operation of the information-processing apparatus 10. Further, the simplified photographing program 52 can be assumed as an introduction (a trial version) for the multifunctional photographing application program 53, and from the viewpoint of a supplier of the information-processing apparatus 10, the user can be prompted to use the multifunctional photographing application program 53 by allowing the simplified photographing program 52 to be quickly launched from the menu screen.

Further, in the present embodiment, since the function of the simplified photographing program 52 is a part of the function of the multifunctional photographing application program 53, the data size of the simplified photographing program 52 is smaller than that of the multifunctional photographing application program 53. Thus, by setting a program launched by the above photographing enabling operation from the menu screen to the simplified photographing program 52 having the smaller data size, it is possible to quickly launch a program for photographing from the menu screen.

(Photographing Leading Processing)

Figure 15:
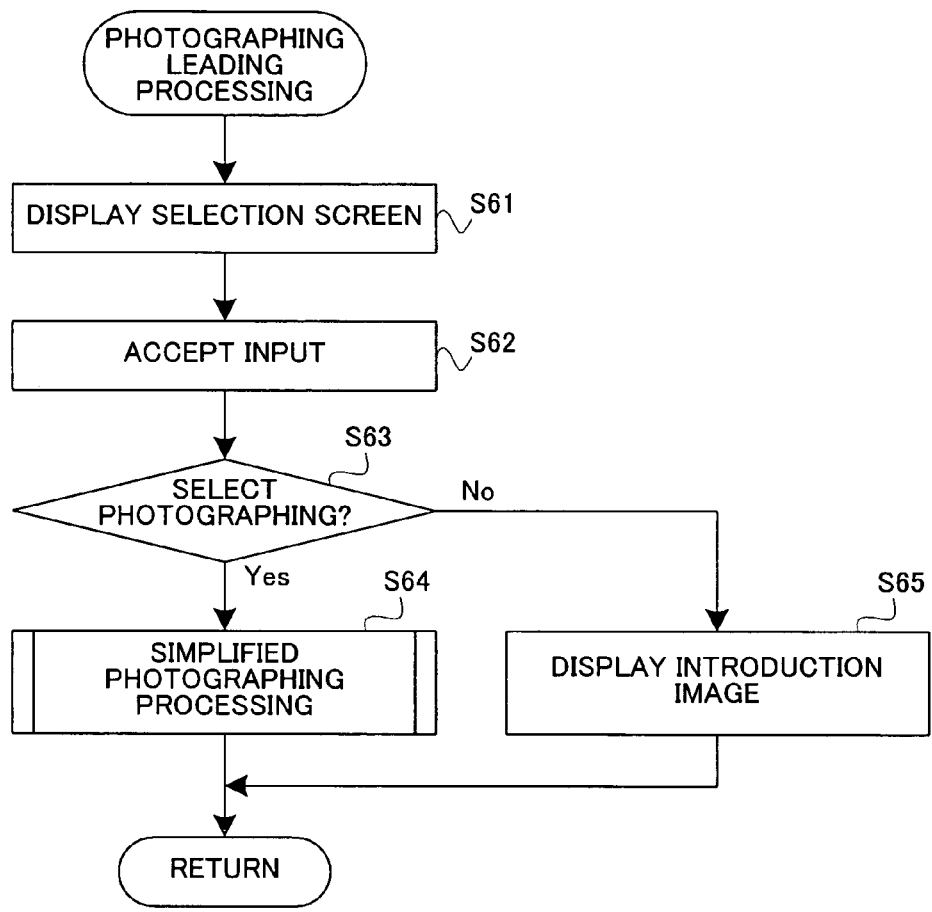
FIG. 15 is a flow chart showing a procedure of photographing leading processing (a step S2) shown in FIG. 6.

The following will describe a detail of the photographing leading processing at the above step S2. FIG. 15 is a flow chart showing a procedure of the photographing leading processing (the step S2) shown in FIG. 6. In the photographing leading processing, first, at a step S61, the CPU 31 displays a selection screen for causing the user to select whether or not to perform photographing (whether or not to shift the state of the information-processing apparatus 10 to the photographing enabled state). For example, along with a message saying "Why don't you take a photograph?", a button image for performing an instruction to perform photographing, and a button image for performing an instruction not to perform photographing are displayed on the lower LCD 12. Subsequent to the step S61, processing at a step S62 is executed.

At the step S62, the CPU 31 accepts an input with respect to each input device. The processing at the step S62 is the same as the processing at the above step S6. Subsequent to the step S62, processing at a step S63 is executed.

At a step S63, the CPU 31 determines whether or not the instruction to perform photographing has been selected. The determination at the step S63 can be made by referring to input position data stored in the main memory 32 at the step S62. In other words, in the determination processing at the step S63, the CPU 31 determines whether or not an input of touching a region where the button image for performing the instruction to perform photographing has been performed. When a result of the determination at the step S63 is positive, processing at a step S64 is executed. On the other hand, when the result of the determination at the step S63 is negative, processing at a later-described step S65 is executed.

At the step S64, the CPU 31 executes simplified photographing processing. This simplified photographing processing is the same as the processing at the above step S10, and thus the detailed description thereof will be omitted. Since the state of the information-processing apparatus 10 is shifted to the photographing enabled state by the simplified photographing processing, the user can perform the photographing operation. After the simplified photographing processing at the step S64 is terminated, the CPU 31 terminates the photographing leading processing shown in FIG. 15. It is noted that in the present embodiment, since the processing at the step S64 is the same as the processing at the step S10, it is possible to launch the multifunctional photographing application program 53 during the simplified photographing processing at the step S64, similarly as at the step S10. However, in an alternative embodiment, in the simplified photographing processing at the step S64, the button image 78 for performing the second launch operation may not be displayed such that it is impossible to launch the multifunctional photographing application program 53.

On the other hand, at the step S65, the CPU 31 displays an image for introducing a photographing function. For example, the CPU 31 displays an image for explaining functions regarding the simplified photographing program 52 and the multifunctional photographing application program 53, and the like on the LCDs 12 and 22. After the step S65, the CPU 31 terminates the photographing leading processing shown in FIG. 15.

As described above, in the present embodiment, the information-processing apparatus 10 determines whether or not the start-up of the information-processing apparatus 10 is for the first time (the step S1). When the information-processing apparatus 10 is started up for the first time (Yes at the step S1), the information-processing apparatus 10 performs a display for causing the user to select whether or not to shift the state of information-processing apparatus 10 to the photographing enabled state (the step S61). Then, when the user selects to perform photographing (Yes at the step S63), the information-processing apparatus 10 causes the user to actually experience the photographing operation (the step S64). Thus, the user can be led to initially experience the photographing operation in the information-processing apparatus 10. In other words, by the photographing leading processing, a user who uses the information-processing apparatus 10 for the first time can be caused to initially perform the photographing operation to get used to the photographing operation. Further, in the present embodiment, since the user is caused to experience the simple photographing operation by the above simplified photographing program 52 at the step S64, the user can easily perform the photographing operation as compared with the case where the user is caused to initially experience the photographing operation by the multifunctional photographing application program 53. Further, from the viewpoint of a manufacturer of the information-processing apparatus 10, the photographing function of the information-processing apparatus 10 can be comprehensively introduced to the user by causing the user to initially experience the simple photographing operation.

In the present embodiment, the user is caused to select whether or not to shift the state of the information-processing apparatus 10 to the photographing enabled state at the step S61. However, in an alternative embodiment, in the photographing leading processing, the state of the information-processing apparatus 10 may be shifted to the photographing enabled state without causing the user to make the selection. In other words, the photographing processing by the photographing program 52 or 53 may be executed without causing the user to make the selection.

(Regarding Change of Display Image)

In the present embodiment, the information-processing apparatus 10 changes content of the display image on the menu screen at a predetermined timing (automatically without an instruction from the user). This produces change in the menu screen, and the user can be prevented from getting bored.

Further, in the present embodiment, the above predetermined timing includes a timing of starting up the information-processing apparatus 10, and a timing of terminating the selected application program. More specifically, as described above, when the information-processing apparatus 10 is started up, or when a selected application program is terminated, the display processing at the step S5 is executed after the processing at the step S3 is executed. Thus, the display image on the menu screen is changed. In other words, every time the information-processing apparatus 10 is started up, or every time a selected application program is executed, the display image is changed. According to this, the user has things to look forward to (about "which image is displayed") at the start-up and at the time of terminating the execution of the selected application program, and hence, from the viewpoint of the supplier of the information-processing apparatus 10, there arises an effect of prompting the user to startup the information-processing apparatus 10 and to execute a selected application program (i.e. to use the information-processing apparatus 10).

Figure 16:
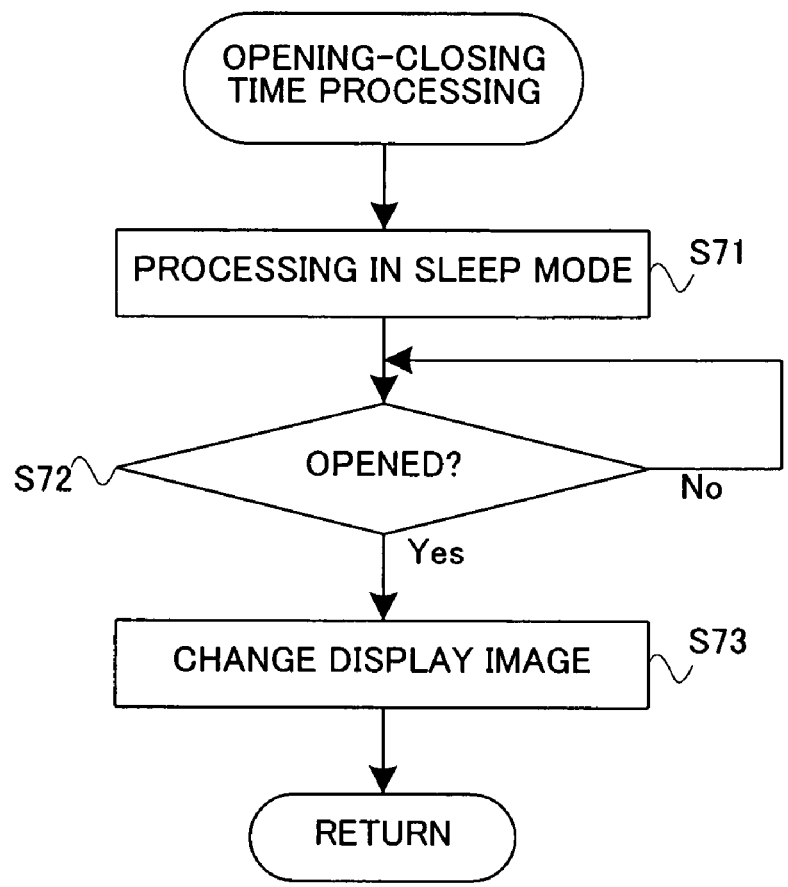
FIG. 16 is a flow chart shown a detail of opening-closing time processing in the present embodiment.

In addition, in the present embodiment, the predetermined timing includes a timing of opening the foldable information-processing apparatus 10. In the present embodiment, since the information-processing apparatus 10 in the closed state is also in a state of a sleep mode, the above "timing of starting up the information-processing apparatus 10" includes a "timing of opening the information-processing apparatus 10 in the closed state (sleep mode) (restarting the information-processing apparatus 10 from the sleep mode). When the information-processing apparatus 10 is opened again after the information-processing apparatus 10 in the opened state is closed, the CPU 31 changes the display image between before and after the closing. Thus, the user has things to look forward to when opening the information-processing apparatus 10, and hence, from the viewpoint of the supplier of the information-processing apparatus 10, there arises an effect of prompting the user to use the information-processing apparatus 10 by making the user open the information-processing apparatus 10. In the present embodiment, at the timing of opening the information-processing apparatus 10 in the closed state, the display image is not changed in a random manner, and is changed in accordance with a predetermined order. With reference to FIG. 16, the following will describe a detail of processing of changing the display image according to opening and closing.

FIG. 16 is a flow chart showing a detail of processing (opening-closing time processing) executed when the information-processing apparatus 10 is closed and opened. The processing shown in FIG. 16 is started by closing the information-processing apparatus 10 at any timing during the processing shown in FIG. 6.

In the opening-closing time processing, first, at a step S71, the CPU 31 shifts the information-processing apparatus 10 to the sleep mode. More specifically, the CPU 31 stops an image display on each of the LCDs 12 and 22, and temporarily stops processing in an application program being executed. Subsequent to the step S71, processing at a step S72 is executed.

At the step S72, the CPU 31 determines whether or not the information-processing apparatus 10 is opened. When a result of the determination at the step S72 is positive, processing at a step S73 is executed. On the other hand, when the result of the determination at the step S72 is negative, the processing at the step S72 is executed again. In other words, the CPU 31 waits until the information-processing apparatus 10 is opened.

At the step S73, the CPU 31 changes the display image in a state before the opening-closing time processing is started. At the step S73, the display image is changed by sequentially selecting a display image among the favorite images in accordance with a predetermined order. The following will describe a method of changing the display image with reference to FIG. 17.

FIG. 17 is a view showing the method of changing the display image at the step S73. FIG. 17 shows a case where the first group includes three favorite images, the second group includes two favorite images, and the third group includes four favorite images. In the present embodiment, the favorite images included in each group are arranged in a predetermined order, and managed. The predetermined order may be an order of time and date to be photographed (stored), an order of time and date to be set as a favorite image, or an order set by the user. At the step S73, a favorite image is sequentially changed in accordance with this order. In other words, the CPU 31 sets a favorite image next to a display image before change (in the state before the opening-closing time processing is started) as a display image after change. Further, when a display image before change is a final favorite image in a group, a first favorite image in a group next to the group is set as a display image after change. Further, when a display image before change is a final favorite image in the third group, a first favorite image in the first group is set as a display image after change. As described above, at the step S73, the display image is changed in accordance with an order indicated by arrows in FIG. 17. Subsequent to the step S73, the CPU 31 terminates the opening-closing time processing, and returns to a state immediately before the opening-closing time processing is started.

As described above, in the present embodiment, every time the information-processing apparatus 10 is opened, the display image is changed in the predetermined order. Thus, the user can enjoy changing display images one after another by an operation of opening and closing the information-processing apparatus 10. For example, the user can create a four-panel cartoon of which a graphic (a display image) is changed every time the information-processing apparatus 10 is opened, and can successionally view a series of photographs arranged in chronological order by repeatedly opening and closing the information-processing apparatus 10. It is noted that at this time, at the above step S3, the CPU 31 may select a display image among a first favorite image in each group in a random manner. Thus, all images included in each group can be successionally displayed in a predetermined order.

In an alternative embodiment, the information-processing apparatus 10 may change the display image in a predetermined order in accordance with a predetermined operation (e.g. an operation of pressing a predetermined button). In other words, the above predetermined timing may be a timing of performing a predetermined operation.

Modified Example

In the above embodiment, predetermined information (data) is commonly used in the simplified photographing program 52 and the multifunctional photographing application program 53. More specifically, the two programs 52 and 53 commonly use information of the camera for taking an image, and information of a storage destination of a stored image. In an alternative embodiment, the two programs 52 and 53 may commonly use other information. For example, in the case where a file name of a stored image is determined based on a total number of images taken by the information-processing apparatus 10, information of the total number of images may be commonly used.

Further, in an alternative embodiment, the information-processing apparatus 10 may cause content of an argument to be passed to the multifunctional photographing application program 53 to be different between when the multifunctional photographing application program 53 is launched in the photographing enabled state (the case of Yes at the step S28) and when the multifunctional photographing application program 53 is launched in the launch acceptance state (the case of Yes at the step S11).

For example, information indicative of a mode at a time of starting executing the multifunctional photographing application program 53 may be the above argument. In other words, the mode at the time of starting executing the multifunctional photographing application program 53 may be different between when the multifunctional photographing application program 53 is launched in the photographing enabled state and when the multifunctional photographing application program 53 is launched in the launch acceptance state. More specifically, when the multifunctional photographing application program 53 is launched in the launch acceptance state, similarly as in the above embodiment, the mode at the time of starting executing the multifunctional photographing application program 53 may be set to a mode for causing the user to select either the photographing mode or the photograph display mode. When the multifunctional photographing application program 53 is launched in the photographing enabled state, the mode at the time of starting executing the multifunctional photographing application program 53 may be set to the photographing mode. When the multifunctional photographing application program 53 is launched in the photographing enabled state, it can be assumed that the user launches the multifunctional photographing application program 53 for performing photographing with a function which the simplified photographing program 52 does not have. Further, in an alternative embodiment, when the multifunctional photographing application program 53 is launched in the photographing enabled state, the mode at the time of starting executing the multifunctional photographing application program 53 maybe set to the photograph display mode, and an image regarding a display image which has been displayed in the photographing enabled state (e.g. a favorite image in the same group as the display image, an image taken on the same day as the display image, and the like) may be displayed.

Further, in the above embodiment, a button image for launching the multifunctional photographing application program 53 in the photographing enabled state (the button image 78 shown in FIG. 9) is one. However, in alternative embodiment, two button images may be displayed. Here, one of the two button images is a button for launching the multifunctional photographing application program 53 with the mode at the time of starting executing the multifunctional photographing application program 53 being set to the photographing mode, and the other button image is a button for launching the multifunctional photographing application program 53 with the mode at the time of starting executing the multifunctional photographing application program 53 being set to the photograph display mode. Thus, in an alternative embodiment, the information-processing apparatus 10 may prepare a plurality of types of second launch operations, and the mode at the time of start of execution (of the multifunctional photographing application program 53) may be different depending on a type of a second launch operation being performed.

Further, in the above embodiment, the simplified photographing program 52 is different from the launch function program 51, and launched by the launch program independently of the launch function program 51. Here, in an alternative embodiment, the simplified photographing program 52 may be a part of the launch function program 51 (i.e. the launch function program 51 and the simplified photographing program 52 may be incorporated into one program in the launch program 61). In an alternative embodiment, the launch function program 51 may launch the simplified photographing program 52. In other words, as long as an instruction (an operation) for launching the simplified photographing program 52 is different from that for launching the multifunctional photographing application program 53, the simplified photographing program 52 and the multifunctional photographing application program 53 may be launched by the same program or by different programs.

As described above, the present embodiment is usable, for example, as an information-processing apparatus which is capable of executing a plurality of programs, in order to use a photographing function by a simple operation.

While the example embodiment presented herein has been described in detail, the foregoing description is in all aspects illustrative and not restrictive. It is understood that numerous other modifications and variations can be devised without departing from the scope of the embodiment.

What is claimed is:

1. A non-transitory computer-readable storage medium storing a launch program executed by a computer of an information-processing apparatus, which comprises imaging elements, which is capable of storing a plurality of application programs, and which stores in advance a predetermined photographing application program for performing photographing by the imaging elements as one of the plurality of application programs, for selectively launching an application program desired by a user among the plurality of application programs, the launch program causing the computer to perform:
accepting a first launch operation for selectively launching the plurality of application programs;

when the first launch operation is performed, launching an application program selected by the first launch operation among the plurality of application programs;

in a predetermined photographing enabled state, executing photographing processing of storing a taken image by the imaging elements in storage locations of the information-processing apparatus in accordance with a predetermined photographing operation;

in a launch acceptance state of accepting the first launch operation, accepting a photographing enabling operation which is the same as the photographing operation, wherein the photographing enabling operation has an operation manner which is different from an operation manner of the first launch operation; and when the photographing enabling operation is detected, setting a state of the information-processing apparatus to the photographing enabled state, wherein the launch program includes a launch function program for launching the application program, and a photographing function program for causing the computer to perform the photographing processing, and the photographing function program has a data size which is smaller than that of the photographing application program.

2. The non-transitory storage medium according to claim 1, wherein
the launch program further causes the computer to perform cancellation for, in the photographing enabled state, automatically canceling the photographing enabled state in accordance with satisfaction of a predetermined condition.

3. The non-transitory storage medium according to claim 2, wherein
the cancellation automatically cancels the photographing enabled state in accordance with execution of the photographing processing a predetermined number of times in the photographing enabled state.

4. The non-transitory storage medium according to claim 3, wherein
the cancellation automatically cancels the photographing enabled state in accordance with a single execution of the photographing processing in the photographing enabled state.

5. The non-transitory storage medium according to claim 1, wherein
the photographing operation and the photographing enabling operation each are a single operation with respect to a predetermined button, which is different from the first launch operation.

6. The non-transitory storage medium according to claim 5, wherein
the predetermined button is a button provided in the information-processing apparatus or a button displayed on a touch panel of the information-processing apparatus.

7. The non-transitory storage medium according to claim 1, wherein
the photographing processing has only a part of a photographing function which is executable by executing the photographing application program.

8. A non-transitory computer-readable storage medium storing a launch program executed by a computer of an information-processing apparatus, which comprises imaging elements, which is capable of storing a plurality of application programs, and which stores in advance a predetermined photographing application program for performing photographing by the imaging elements as one of the plurality of application programs, for selectively launching an application program desired by a user among the plurality of application programs, the launch program causing the computer to perform:

accepting a first launch operation for selectively launching the plurality of application programs;

when the first launch operation is performed, launching an application program selected by the first launch operation among the plurality of application programs;

in a predetermined photographing enabled state, executing photographing processing of storing a taken image by the imaging elements in storage locations of the information-processing apparatus in accordance with a predetermined photographing operation;

in a launch acceptance state of accepting the first launch operation, accepting a predetermined photographing enabling operation, wherein the photographing enabling operation has an operation manner which is different from an operation manner of the first launch operation;

when the photographing enabling operation is performed, setting a state of the information-processing apparatus to the photographing enabled state; and in the photographing enabled state, automatically canceling the photographing enabled state in accordance with satisfaction of a predetermined condition, wherein the launch program includes a launch function program for launching the application program, and a photographing function program for causing the computer to perform the photographing processing, and the photographing function program has a data size which is smaller than that of the photographing application program.

9. The non-transitory storage medium according to claim 8, wherein
the cancellation automatically cancels the photographing enabled state in accordance with execution of the photographing processing a predetermined number of times in the photographing enabled state.

10. The non-transitory storage medium according to claim 9, wherein
the cancellation automatically cancels the photographing enabled state in accordance with a single execution of the photographing processing in the photographing enabled state.

11. The non-transitory storage medium according to claim 8, wherein
the photographing operation and the photographing enabling operation each are a single operation with respect to a predetermined button, which is different from the first launch operation.

12. The non-transitory storage medium according to claim 11, wherein
the predetermined button is a button provided in the information-processing apparatus or a button displayed on a touch panel of the information-processing apparatus.

13. The non-transitory storage medium according to claim 8, wherein
the photographing processing has only a part of a photographing function which is executable by executing the photographing application program.

14. A non-transitory computer-readable storage medium storing a launch program executed by a computer of an information-processing apparatus, which comprises imaging elements, which is capable of storing a plurality of application programs, and which stores in advance a predetermined photographing application program for performing photographing by the imaging elements as one of the plurality of application programs, for selectively launching an application program desired by a user among the plurality of application programs, the launch program causing the computer to perform:

accepting a first launch operation for selectively launching the plurality of application programs;

when the first launch operation is performed, launching an application program selected by the first launch operation among the plurality of application programs;

executing photographing processing of storing a taken image by the imaging elements in storage locations of the information-processing apparatus in accordance with a predetermined photographing operation;

in a launch acceptance state of accepting the first launch operation, accepting a photographing enabling operation, which is different from the first launch operation and is a single operation with respect to a predetermined button, for causing a photographing enabled state in which the photographing processing is executable in accordance with the photographing operation; and when the photographing enabling operation is performed, setting a state of the information-processing apparatus to the photographing enabled state, and accepting the photographing operation, wherein the launch program includes a launch function program for launching the application program, and a photographing function program for causing the computer to perform the photographing processing, and the photographing function program has a data size which is smaller than that of the photographing application program.

15. The non-transitory storage medium according to claim 14, wherein
the predetermined button is a button provided in the information-processing apparatus or a button displayed on a touch panel of the information-processing apparatus.

16. The non-transitory storage medium according to claim 14, wherein
the photographing processing has only a part of a photographing function which is executable by executing the photographing application program.

17. An information-processing apparatus which comprises imaging elements and is capable of storing a plurality of application programs for selectively launching an application program desired by a user among the plurality of application programs via a launch program,
a predetermined photographing application program for performing photographing by the imaging elements is stored in advance as one of the plurality of application programs in the information-processing apparatus, the information-processing apparatus comprising at least one computer processor configured to:
accept a first launch operation for selectively launching the plurality of application programs;
when the first launch operation is performed, launch an application program selected by the first launch operation among the plurality of application programs;
in a predetermined photographing enabled state, execute photographing processing of storing a taken image by the imaging elements in storage locations of the information-processing apparatus in accordance with a predetermined photographing operation;
in a launch acceptance state of accepting the first launch operation, accept a photographing enabling operation which is the same as the photographing operation, wherein the photographing enabling operation has an operation manner which is different from an operation manner of the first launch operation; and when the photographing enabling operation is detected, set a state of the information-processing apparatus to the photographing enabled state, wherein
the launch program includes a launch function program for launching the application program, and a photographing function program for causing the computer to perform the photographing processing, and
the photographing function program has a data size which is smaller than that of the photographing application program.

18. An information-processing apparatus which comprises imaging elements and is capable of storing a plurality of application programs for selectively launching an application program desired by a user among the plurality of application programs via a launch program,
a predetermined photographing application program for performing photographing by the imaging elements is stored in advance as one of the plurality of application programs in the information-processing apparatus, the information-processing apparatus comprising at least one computer processor configured to:
accept a first launch operation for selectively launching the plurality of application programs;
when the first launch operation is performed, launch an application program selected by the first launch operation among the plurality of application programs;
in a predetermined photographing enabled state, execute photographing processing of storing a taken image by the imaging elements in storage locations of the information-processing apparatus in accordance with a predetermined photographing operation;
in a launch acceptance state of accepting the first launch operation, accept a predetermined photographing enabling operation, wherein the photographing enabling operation has an operation manner which is different from an operation manner of the first launch operation;
when the photographing enabling operation is detected, set a state of the information-processing apparatus to the photographing enabled state; and
in the photographing enabled state, automatically cancel the photographing enabled state in accordance with satisfaction of a predetermined condition, wherein
the launch program includes a launch function program for launching the application program, and a photographing function program for causing the computer to perform the photographing processing, and
the photographing function program has a data size which is smaller than that of the photographing application program.

19. An information-processing apparatus which comprises imaging elements and is capable of storing a plurality of application programs for selectively launching an application program desired by a user among the plurality of application programs via a launch program,
a predetermined photographing application program for performing photographing by the imaging elements is stored in advance as one of the plurality of application programs in the information-processing apparatus, the information-processing apparatus comprising at least one computer processor configured to:
accept a first launch operation for selectively launching the plurality of application programs;
when the first launch operation is performed, launch an application program selected by the first launch operation among the plurality of application programs;
execute photographing processing of storing a taken image by the imaging elements in storage locations of the information-processing apparatus in accordance with a predetermined photographing operation;

in a launch acceptance state of accepting the first launch operation, accept a photographing enabling operation, which is different from the first launch operation and is a single operation with respect to a predetermined button, for causing a photographing enabled state in which the photographing processing is executable in accordance with the photographing operation; and when the photographing enabling operation is performed, set a state of the information-processing apparatus to the photographing enabled state, and accept the photographing operation, wherein the launch program includes a launch function program for launching the application program, and a photographing function program for causing the computer to perform the photographing processing, and the photographing function program has a data size which is smaller than that of the photographing application program.

* * * * *